United States Patent
Ehrfeld et al.

(10) Patent No.: US 7,615,274 B2
(45) Date of Patent: Nov. 10, 2009

(54) STORAGE MAGAZINE FOR MICROSTRUCTURED MOLDED PARTS AND FABRICATION PROCEDURE

(75) Inventors: Wolfgang Ehrfeld, Mainz (DE); Lutz Weber, Contwig (DE)

(73) Assignee: Institut fur Mikrotechnik Mainz GmbH, Mainz (DE)

( * ) Notice: Subject to any disclaimer, the term of this patent is extended or adjusted under 35 U.S.C. 154(b) by 0 days.

(21) Appl. No.: 11/715,581

(22) Filed: Mar. 8, 2007

(65) Prior Publication Data

US 2007/0170616 A1 Jul. 26, 2007

Related U.S. Application Data

(62) Division of application No. 10/009,184, filed as application No. PCT/EP00/03979 on May 4, 2000, now Pat. No. 7,201,863.

(30) Foreign Application Priority Data

Jun. 9, 1999 (DE) ................................. 199 26 181

(51) Int. Cl.
   *B32B 3/00* (2006.01)
   *B23Q 7/10* (2006.01)
   *C25D 1/10* (2006.01)
   *B65D 73/02* (2006.01)
   *H05K 13/04* (2006.01)
(52) U.S. Cl. ....................... 428/172; 428/192; 206/488; 206/710; 257/684; 29/809
(58) Field of Classification Search ................. 428/172, 428/78, 67, 192; 206/488, 562, 701, 729, 206/809, 710; 211/60.2, 60.1; 257/678, 257/684, 723; 361/600; 29/729, 809
See application file for complete search history.

(56) References Cited

U.S. PATENT DOCUMENTS 1,555,954 A * 10/1925 Steinberger et al. ......... 336/205

(Continued)

FOREIGN PATENT DOCUMENTS

DE 197 09 136 9/1998

(Continued)

OTHER PUBLICATIONS

WO 97/11888, Apr. 1997.*
JP 06-008276, Jan. 1994.*
*Primary Examiner*—Donald Loney
(74) *Attorney, Agent, or Firm*—Hudak, Shunk & Farine Co., LPA

(57) ABSTRACT

This describes a procedure for replicative fabrication and packaging of at least one microstructured molded part as one magazine/molded part composite as well as a magazine with at least one microstructured molded part as one magazine/molded part composite. The first step covers fabrication of at least one microstructured molded part using an initially closed tool which consists of at least one first and one second tool half. In the second step, both tool halves are opened, whereby the molded part remains in the first tool half. In the third step, at least the second tool half is replaced with at least one additional tool half. In the fourth step, the replicative fabrication of the magazine is carried out using the first tool half containing the molded part and the additional tool half. Finally in the fifth step, magazine and molded part are demolded simultaneously as one magazine/molded part composite. Under the invention, either the magazine or the microcomponents can be fabricated first depending on the final design of the microcomponent and magazine. This procedure, which preferably uses a 2-component injection molding process, allows the direct fabrication of several molded parts or microcomponents and their magazine packaging as one magazine/molded part composite without any after-treatment requirement, whereby different physical heights are fabricated for the magazine and microcomponents. Since the magazine connects the microcomponents only at parts of the side, bottom or face surfaces, a gripper can be used for very precise, fully automated mounting of the microcomponent.

20 Claims, 17 Drawing Sheets

U.S. PATENT DOCUMENTS

| | | | |
|---|---|---|---|
| 3,262,521 A * | 7/1966 | Warnaka | 188/268 |
| 3,703,572 A | 11/1972 | Bellasalma | |
| 3,761,554 A | 9/1973 | Barnette | |
| 3,950,462 A | 4/1976 | Shaffer et al. | |
| 4,381,963 A | 5/1983 | Goldstein et al. | |
| 4,544,126 A | 10/1985 | Melchert | |
| 4,904,429 A | 2/1990 | Takahashi et al. | |
| 4,927,580 A | 5/1990 | Nasu et al. | |
| 5,118,458 A | 6/1992 | Nishihara et al. | |
| 6,164,448 A * | 12/2000 | Schmutz et al. | 206/488 |
| 6,305,921 B1 | 10/2001 | Grams et al. | |
| 6,446,270 B1 | 9/2002 | Durr | |
| 6,454,970 B1 | 9/2002 | Ohman et al. | |
| 6,531,080 B1 * | 3/2003 | Ehrfeld et al. | 264/139 |

FOREIGN PATENT DOCUMENTS

| | | |
|---|---|---|
| DE | 198 42 456 | 4/1999 |
| EP | 0 517 613 | 12/1992 |
| WO | WO 98/39230 | 9/1998 |
| WO | WO 98/39501 | 9/1998 |

* cited by examiner

STORAGE MAGAZINE FOR MICROSTRUCTURED MOLDED PARTS AND FABRICATION PROCEDURE

CROSS REFERENCE

This application is a division of application Ser. No. 10/009,184, filed on May 15, 2002, now U.S. Pat. No. 7,201,863, of Wolfgang Ehrfeld, et al. which claims priority to PCT/EP00/03979, filed May 4, 2000 which claims priority to German Application Serial No. 19926181.4, filed Jun. 9, 1999.

FIELD OF THE INVENTION

This invention concerns a procedure for the replicative fabrication and packaging of at least one microstructured molded part in form of one magazine/molded part composite and a magazine with at least one microstructured molded part presented as magazine/molded part composite.

BACKGROUND OF THE INVENTION

In plastic technology molded parts usually are produced in large numbers using an injection molding process and micro-technically fabricated mold inserts, whereupon they are forwarded in bulk for mounting. This process also is used for mounting microstructured molded parts, called microcomponents in the following, whereby the mounting tolerances of the microcomponents are significantly smaller due to the microstructures in comparison to molded parts without microstructures.

A disadvantage of this process is that the specified ordered state is lost during replicative microcomponent production due to the mold insert, so that the molded parts must be mounted individually. Additionally, many devices are necessary to restore the ordered state and to mount the microcomponents.

Prior art exists to avoid these disadvantages by packaging the microcomponents prior to their mounting in a separate and additionally fabricated holder or magazine so many microcomponents can be mounted at once. Major disadvantages of handling the microcomponents this way are that the two separate production process for the microcomponents and the magazine result in manufacturing tolerances that cause inaccuracies in positioning and placing of the microcomponents inside the magazine. Additionally, due to the required separate packaging step joints inside the magazine are needed for storing the microcomponents. Subsequently, this procedure does not significantly reduce costs, in particular equipment costs up to and during mounting of the microcomponents.

To avoid the additional magazine-mounting step, the applicant has filed two procedures already, which disclose a direct consecutive fabrication of microcomponents and storage magazine, eliminating the disadvantages described before.

The prior art in WO 98/39230 describes a procedure to fabricate and package microcomponents and a magazine for at least one microcomponent as well as mounting procedures for microcomponents. In the first step of this procedure, at least one microcomponent is made on top of a component base plate. Then the exposed lateral surfaces of the microcomponent are cast in using a solidifying forming material. Subsequently, the component base plate and/or the mold material covering the microcomponent is removed by a mechanical process like grinding, lapping, milling, or polishing. The resulting magazine for at least one microcomponent consists of a disk-shaped plate that provides a positive enclosure of the microcomponent's lateral surfaces. The mounting procedure provides that the magazine is gripped and held by a magazine holder, whereupon the microcomponent to be mounted is pressed out of the magazine and positioned at its final location.

The prior art in WO 98/39501 describes a procedure to fabricate and package metallic microcomponents. In the first step of this procedure, a magazine is fabricated from electrically non-conductive mold material that positively enclosed the lateral surfaces of at least one microcomponent made of a chemically soluble material (first type microcomponent). The preferred mode of fabrication for the magazine with first type microcomponents uses the above-described procedure of WO 98/39230 for the fabrication and packaging of microcomponents. In a second step of the procedure, a coating or substrate consisting of an electrically conductive material is applied to one side of the magazine and its first type microcomponent. In the next step, the first type microcomponent is removed. Then the empty magazine is filled with a metal or a metal alloy for the fabrication of a second type microcomponent. Finally, the coating or substrate is removed.

The disadvantage of both described procedures is that the microcomponents first have to be replicated on a base plate and then the mold material has to be poured into a mold to fixate the microcomponent in its position. This requires an extensive additional process step for the magazine fabrication, and the base plate as well as the excess mold material above the microcomponent in the mold must be removed by a mechanical process. Since the magazine provides a positive enclosure of the microcomponent sides, the magazine height always conforms to the microcomponent height. Therefore, microcomponents with very low height require very thin magazines, which are not stable enough for mounting and transportation of the microcomponents. Additionally, it does not allow the packaging of complex microcomponent designs with undercuts, and microcomponents with tapered ends only can be pushed out of the magazine at the side opposite of the tapered end. A magazine designed as a positively enclosing plate generally is inconvenient for machine mounting of the microcomponents, e.g. using a gripper, since the gripper cannot grab the microcomponents at their sides.

THE SUMMARY OF THE INVENTION

The object of the invention is to specify a magazine with microstructured molded parts and a procedure for the fabrication and packaging of microstructured molded parts, whereby the position of the microstructured molded parts to each other that is established during replicative fabrication of the molded parts will be maintained in the invented magazine during handling, transportation and mounting of the molded parts, and whereby all disadvantages described above will be eliminated.

The procedure for replicative fabrication and packaging of at least one microstructured molded part as one magazine/molded part composite is characterized by the following process steps:

a. Replicative fabrication of at least one microstructured molded part using an initially closed tool consisting of at least one first and one second tool half;

b. Opening of the two tool halves, whereby the molded part remains in the first tool half.

c. Replacing at least one second tool half with at least one other tool half;

d. Replicative fabrication of the magazine using the first tool half with the molded part and the other tool half;

e. Demolding of both the magazine and the molded part as one magazine/molded part composite.

The procedure of this invention allows direct fabrication of several molded parts, i.e. microcomponents, with very small sized microstructures of <1 mm, in particular <300 micrometers, and their packaging in form of a magazine/molded part composite without any after-treatment, whereby a split tool and preferably a two-component injection molding process is used. This allows a significantly more cost-effective and more efficient fabrication of microcomponents and their magazines compared to prior art, since the microcomponents and the magazine are made with one tool setup in two consecutive replication processes. This eliminates additional construction elements, such as the base plates used for vacuum casting, and the extensive additional work steps for mechanical after-treatment to construct the magazine.

Another benefit of this procedure is that the positions of the different molded parts to each other, which are defined by the tool during replicative fabrication of microcomponents and fixated by the invented replicative fabrication of the magazine, are maintained in the magazine. This allows very precise mounting of microcomponents, since this new ordered condition of the molded parts allows microcomponent handling with very small mounting tolerances. Additionally, this provides a very cost-effective storage and transportation of the microcomponents, since they can be moved jointly.

Another benefit is that production lines set up for connection to a semi-conductor production line can be used for fabrication of the magazines. In these production lines, the magazine preferably will be made in the common semi-conductor format of a 3", 4" or 6" wafer. This ensures that subsequent processing of the magazine and/or the microcomponents in systems of the semi-conductor industry will be possible without any after-treatment. For example, this will allow subsequent coating of the magazine and/or the microcomponents in a sputter system and fully automated assembly of the microcomponents in the standard systems of the semi-conductor industry.

The invented magazine/molded part composite allows fully automated mounting of microcomponents, whereby an assembly gripper is used as described in the following.

The invented procedure allows fabrication of microcomponents in various sizes and a magazine in form of one magazine/molded part composite and flexible adaptation of the magazine to the microcomponents and/or the microcomponents to the magazine so that all described disadvantages of the prior art are avoided.

This invention does not bindingly specify the sequence for manufacturing the microcomponents and the magazine, because the replication tools being used determine the dimensions of the microcomponents and the magazine. Depending on the microcomponent and magazine final design, either the magazine or the microcomponents may be fabricated first. Either way all benefits of the invention described above remain intact. This invented procedure for the replicative fabrication and packaging of at least one microstructured molded part in form of a magazine/molded part composite is characterized by the following process steps.

a. Replicative fabrication of the storage magazine using an initially closed tool consisting of at least one first and one second tool half;
b. Opening of the two tool halves, whereby the magazine remains in the first tool half.
c. Replacing at least the second tool half with at least one other tool half;
d. Replicative fabrication of at least one microstructured molded part using the first tool half containing the magazine and the other tool half;
e. Demolding of both the magazine and the molded part as one magazine/molded part composite.

A first mode of the invention uses at least one microstructured mold insert for fabrication of the magazine and/or molded part in the tool. Since the microstructured mold insert preferably is a multiple tool with several cavities, many microcomponents can be produced per injection cycle.

A very special advantage of this invention is that the molded part and the magazine are constructed with different physical heights. This allows a flexible adaptation of the magazine height to the microcomponents, whereby either the magazine or the microcomponents are higher depending on the microcomponent design. Even microcomponents with a very low physical height can be produced using a magazine with significantly higher physical height in one magazine/molded part composite. This improves the stability of the magazine and subsequently handling of the microcomponents during storage, transportation and assembly.

One advantageous design form of the invention is that the magazine can be fabricated with a side overhang in relation to the horizontal dimension of the molded part. This way the magazine will provide surfaces that can freely be profiled to provide a great holding surface for the gripper without having to touch the microcomponents.

Another special advantage of this invention is that the magazine is constructed with a holding contact to the lateral surfaces of the molded part. This special design allows lateral gripping of the microcomponents by a mounting gripper, since the invented holding contact exists only with the side surfaces of the microcomponent and does not fully enclose all side surfaces of the microcomponent. This generally provides protection for the microstructures of the microcomponents, since the holding contact between magazine and microcomponent can be created on side surfaces that do not contain any microstructures. Additionally, any microstructured surfaces on the face and/or bottom surfaces are protected also.

Furthermore, this special design form reduces the contact surfaces between magazine and microcomponent in comparison to a positive all-around molding in of the microcomponents. This allows easier detachment and removal of the microcomponents from the magazine so that microcomponents easily can be pressed out by hand or my machine without much force.

Finally, this special design form allows removal of the microcomponents on both sides of the magazine. This applies to microcomponents with a tapered end and for undercut microcomponents, since the holding contact with the magazine can be formed only on the microcomponent side surface with the largest diameter.

Protection of the sometimes very small microstructured surfaces of the microcomponents also can be achieved by constructing the magazine with holding contact to the microstructures of the molded part. The holding contact ensures easy detachment of the magazine from the microstructures surfaces without any risk of damage, like tearing off, to the microstructures.

Another design form of the invention provides that the magazine is constructed with recesses. These recesses preferably are made with microstructured mold inserts that provide negative forms like steps, columns, walls or similar shapes and are adjoining the side surfaces of the microcomponents. This creates recesses, i.e. free space without mold material inside the magazine, preferably directly next to the microcomponents. This allows the gripper to grip the microcomponent at all side surfaces made accessible by the recesses and also through the recess at the bottom and facing surfaces. Of course the free spaces also can be formed in relation to the magazine height as recesses or gripper pockets inside the magazine, whereby at least parts of the side surfaces of the microcomponent still are in contact with the magazine. The recessed design of the magazine causes further reduction of the holding contact surfaces and therefore the adhesion forces between magazine and microcomponent, so that the removal of the microcomponent from the magazine requires even less force. Furthermore, entire sides of the microcomponent inside the magazine can be exposed resulting in even less holding contact between magazine and microcomponent and making detachment of the microcomponent even easier. On the other hand, the recess/free space can be created adjoining the molded part to such an extent, that a microcomponent can be removed in its entirety from the magazine. With this method, the microcomponent first is shifted laterally at magazine level into the recess and then lifted vertically from the magazine. Of course these recesses also can be utilized for handling or holding the magazine during transportation, storage or mounting.

Another beneficial design form of the invention is that the magazine can be constructed with holding contact to the bottom or face surface of the molded part. This way the microcomponent sits in the magazine so the mounting gripper can grip the microcomponent at the entire side surface. Since the holding contact preferably is formed between the unstructured bottom or face of the microcomponent and the magazine, this magazine design is especially advantageous for microcomponents without suitable side surfaces for molding to the magazine, e.g., microcomponents with conical or concave or otherwise arched side surfaces. This also allows magazine packaging of microcomponents with undercuts, since these can be removed from the magazine in an easy and simple way.

In order to further reduce the holding contact in this magazine design and to further simplify the detachment process, the magazine is constructed with holding contact to parts of the bottom or parts of the face surfaces of the molded part. This design also makes it easier to press the microcomponent out of the magazine.

A very constructive characteristic of the invention is that the molded part and the magazine can be made with the same or with different mold material. This allows implementation of different physical features and functions of the magazine and the molded part and their combination in form of a magazine/molded part composite; i.e., mechanical strength, optical transparency, temperature resistance, softening point as well as adherence and detachment characteristics between magazine and microcomponent.

In one invented procedure namely, the replicative fabrication and packaging of at least one microstructured molded part as one magazine/molded part composite, characterized by the following process steps: (a) replicative fabrication of the magazine (12) using an initially closed tool (5) which consists of at least one first and one second tool half (5a, 5b); (b) opening of both tool halves (5a, 5b), whereby the magazine (12) remains in the first tool half (5a); (c) replacing at least the second tool half (5b) with at least one additional tool half (5c); (d) replicative fabrication of at least one microstructured molded part (1, 3, 10) using the first tool half (5a) which contains the magazine (12) and the additional tool half (5c); and (e) simultaneous demolding of the magazine (12) and the molded part (1, 3, 10) as one magazine/molded part composite (15), the magazine fabricated in process step (a) is used like a mold insert and serves as lateral boundary for the subsequent process steps for microcomponent production. Therefore, it is within the meaning of the invention to reuse an already fabricated magazine as a mold insert for microcomponent production. The design of the invented procedure for replicative production and magazine packaging of at least one microtechnically fabricated molded part as a magazine/molded part composite is characterized by the following process steps:

a. Replicative fabrication of at least one microstructured molded part using a prefabricated magazine;

b. Demolding of both the magazine and the molded part as one magazine/molded part composite.

This design type of the invented procedure offers a special advantage in comparison to the previously described two procedures, since the replication process for fabrication of the magazine is eliminated. This allows significantly shorter cycle times for production of the magazine/molded part composite with microcomponents. Additionally, cost and mold material can be saved, and the emptied magazines can be reused for the fabrication of microcomponents. Reuse of the magazine also can provide a great advantage, since the magazine may already contain structures or negative forms for the subsequent fabrication of the microcomponent. Subsequently, the microstructured mold insert to be used for fabrication of the microcomponent can be designed much simpler resulting in additional cost and time savings. Furthermore, the microcomponents could not only be fabricated using the 2-component injection molding process but also with the hot embossing process known in microstructure technology to form one polymer piece, since the magazine already sets the order state and position of the microcomponents by establishing a lateral boundary during the replicative production of the microcomponents.

A disadvantage of this procedure may be that a large inventory of magazines may be necessary for the production of a large number of microcomponents. However, the already described advantages more than compensate for this one disadvantage.

A special advantage of this design form of the invented procedure is that a split tool is used, which consists of at least a first and a second tool half. This ensures that the prefabricated magazine easily can be inserted into one of the two tool halves. Subsequently, the tool is closed and the replicative fabrication of the microcomponents is carried out. Finally, the tool is opened and the prefabricated magazine with the formed-in microcomponents is demolded as one single magazine/molded part composite.

Another preferred characteristic of this design form of the invented procedure is that for the prefabricated magazine, a magazine fabricated according to the replicative fabrication and packaging of at least one microstructured molded part in form of one magazine/molded part composite, characterized by the following process steps: (a) replicative fabrication of at least one microstructured molded part (1, 3, 10) using an initially closed tool (4) which consists of at least one first and one second tool half (4a, 4b); (b) opening of both tool halves (4a, 4b). whereby the molded part (1, 3, 10) remains in the first tool half (4a); (c) replacing at least the second tool half (4b) with at least one additional tool half (4c); (d) replicative fabrication of the magazine (12) using the first tool half (4a) which contains the molded part (1, 3, 10) and the additional tool half (4c); and (e) simultaneous demolding of the magazine (12) and the molded part (1, 3, 10) as one magazine/molded part composite (15); or the replicative fabrication and packaging of at least one microstructured molded part as one magazine/molded part composite, characterized by the following process steps: (a) replicative fabrication of the magazine (12) using an initially closed tool (5) which consists of at least one first and one second tool half (5a, 5b); (b) opening of both tool halves (5a, 5b), whereby the magazine (12) remains in the first tool half (5a); (c) replacing at least the second tool half (5b) with at least one additional tool half (5c); (d) replicative fabrication of at least one microstructured molded part (1, 3, 10) using the first tool half (5a) which contains the magazine (12) and the additional tool half (5c); and (e) simultaneous demolding of the magazine (12) and the molded part (1, 3, 10) as one magazine/molded part composite (15), will be used after removing the microstructured molded parts. This allows reuse of the invented magazine. Other prefabricated magazines, e.g. metal magazines, of course can be reused also in this procedure.

The magazine with at least one microstructured molded part, presented as magazine/molded part composite, is characterized by the magazine adheres to the molded part in at least one area of its surface by holding contact. The invented magazine preferably should be fabricated by one of the invented procedures, namely, for the replicative fabrication and packaging of at least one microstructured molded part in form of one magazine/molded part composite, characterized by the following process steps: (a) replicative fabrication of at least one microstructured molded part (1, 3, 10) using an initially closed tool (4) which consists of at least one first and one second tool half (4a, 4b); (b) opening of both tool halves (4a, 4b), whereby the molded part (1, 3, 10) remains in the first tool half (4a); (c) replacing at least the second tool half (4b) with at least one additional tool half (4c); (d) replicative fabrication of the magazine (12) using the first tool half (4a) which contains the molded part (1, 3, 10) and the additional tool half (4c); and (e) simultaneous demolding of the magazine (12) and the molded part (1, 3, 10) as one magazine/ molded part composite (15); or the replicative fabrication and packaging of at least one microstructured molded part as one magazine/molded part composite, characterized by the following process steps: (a) replicative fabrication of the magazine (12) using an initially closed tool (5) which consists of at least one first and one second tool half (5a, 5b); (b) opening of both tool halves (5a, 5b), whereby the magazine (12) remains in the first tool half (5a); (c) replacing at least the second tool half (5b) with at least one additional tool half (5c); (d) replicative fabrication of at least one microstructured molded part (1, 3, 10) using the first tool half (5a) which contains the magazine (12) and the additional tool half (5c); and (e) simultaneous demolding of the magazine (12) and the molded part (1, 3, 10) as one magazine/molded part composite (15); or the procedure for the replicative fabrication and packaging of at least one microstructured molded part as one magazine/ molded part composite characterized by the following process steps: (a) replicative fabrication of at least one microstructured molded part (1, 3, 10) using a prefabricated magazine (12'); and (b) simultaneous demolding of the magazine (12') and the molded parts (1, 3, 10) as one magazine/ molded part composite (15'). This way, the invented magazine can hold the microcomponents in a flexible way at any physical height and either on the lateral and/or facing surfaces and/or bottom surfaces. The holding contact may be positive across the entirety of the respective surface or merely at parts of the respective surface.

In a preferred design, the holding contact between the magazine and one or several areas of the microcomponent surface formed in a way where the magazine's mold material does not create a chemical connection to the molded part's mold material but rather in form of a physical holding contact, e.g., due to the coarseness of the surface or thermally initiated incipient fusion. This ensures that very little force is needed to detach the microcomponent from the magazine. This invented holding contact is especially suitable for fully automated mounting, since virtually no reaction force is transferred to the mounting gripper during removal of the microcomponents. The microcomponents also can be pressed out of the magazine by hand or machine.

An especially advantageous design of this invention is that the magazine can have a different physical height than the molded part. This allows a flexible adaptation of the magazine's physical height to the microcomponent's physical height. For example, the microcomponents can be packaged in a magazine with much larger physical height. This allows an improvement of the stability of the magazine/molded part composite and improved handling of the microcomponents during transportation, storage and mounting. Additionally, this special design form of the magazine is advantageous for mounting by pressing the microcomponents out of the magazine, since the magazine or the channel-shaped walls of the magazine serve as guides for the precise positioning of the microcomponents.

The microcomponents may also be packaged in a magazine with less physical height. This special design form of the magazine reduces the holding surface and subsequently the holding forces between magazine and microcomponent resulting in less force requirement for the removal of the microcomponent from the magazine. Furthermore, this presents a very cost-effective magazine design, since mold material and cycle times are reduced when using the preferred replicative fabrication process for the magazine.

Another special characteristic of the invention is that the magazine holds the molded part only at certain areas of its side surfaces. Since this special magazine design holds the microcomponent not across the entire side surface but merely at parts of its side surface, the microcomponent packaged into the magazine will have exposed side surfaces. A particular consideration of this invention is to use these exposed surfaces during mounting of the microcomponents by using a mounting gripper and enable fully automated gripping of the microcomponents. Another advantage of this partial holding contact between the microcomponent's sides and the magazine is that microcomponents with undercuts or tapered ends can be packaged in the magazine in a way where these microcomponents can be removed in both directions for mounting. This can be done, for example, by having the magazine hold the microcomponent only at its side surface with the largest diameter.

In order to allow fully automated mounting of the microcomponents in a production line of the semi-conductor industry, the magazine provides a wafer form in the standard format of the semi-conductor industry. This also allows further processing of the microcomponents and/or the magazine in a semi-conductor production line; e.g. subsequent coating of the magazine and/or the microcomponents in a sputter system or bonding other parts like electrodes to the microcomponent.

A special advantage of the invention is that the magazine holds the molded part at its microstructured surfaces. This provides protection for the very small and easily damaged microstructures of the microcomponent, in particular during storage and transportation of the magazine. The invented connection of the molded parts to the magazine by holding contact ensures that the magazine can be detached from the microcomponents with only minor force eliminating any risk of damaging the microcomponent.

Another special design of the magazines provides that the magazine has at least one recess adjoining the lateral surfaces of the molded part. This creates free spaces without mold material inside the magazine so that the mounting gripper can grab the microcomponent in the area of these recesses across the entire side surface. Additionally, these free spaces allow the gripper to reach through the recess to grab the microcomponent at the bottom surface. Furthermore, this special design of the magazine with recesses facilitates detachment of the microcomponent from the magazine, since only parts of the microcomponent's side surfaces must be detached from the magazine instead of the entire side of the microcomponent. This also results in a quicker mounting process. Of course these recesses also can be utilized as gripper pockets for handling or holding the magazine during transportation, storage or mounting. Additionally, these recesses can be made with a sufficiently large outside diameter, so that microcomponents with undercuts or tapered ends can be removed from the magazine through these spaces in both directions. In order to maintain the magazine's or magazine/molded part composite's stability, the magazine may adhere positively across one entire side of the microcomponent, while the other side has a recess.

An especially simple design of the magazine provides that the magazine connects across the entire surface of the bottom or face of the molded part. In this case, the invented holding contact allows that the microcomponent sits in the magazine so the gripper can grab the microcomponent across its entire side. Since the holding contact preferably is built between the unstructured bottom or face of the microcomponent and the magazine, this magazine design is especially advantageous for microcomponents without suitable side surfaces for molding to the magazine, e.g., microcomponents with conical or concave or otherwise arched side surfaces. This also allows magazine packaging of microcomponents with undercuts, since these can be removed from the magazine in an easy and simple way.

In order to further reduce the force required for detaching the microcomponent from the magazine, another magazine design provides that the magazine connects the molded part at sections of its bottom surface or sections of its face. Since the holding contact exists only in parts of the bottom and face instead of the entire surfaces, pressing out of the microcomponent from the magazine becomes easier also.

For the fabrication of the magazine it is especially advantageous that the magazine and the molded part can be fabricated replicative using the procedure for the replicative fabrication and packaging of at least one microstructured molded part in form of one magazine/molded part composite, characterized by the following process steps: (a) replicative fabrication of at least one microstructured molded part (1, 3, 10) using an initially closed tool (4) which consists of at least one first and one second tool half (4a, 4b); (b) opening of both tool halves (4a, 4b), whereby the molded part (1, 3, 10) remains in the first tool half (4a); (c) replacing at least the second tool half (4b) with at least one additional tool half (4c); (d) replicative fabrication of the magazine (12) using the first tool half (4a) which contains the molded part (1, 3, 10) and the additional tool half (4c); and (e) simultaneous demolding of the magazine (12) and the molded part (1, 3, 10) as one magazine/ molded part composite (15); or the procedure for replicative fabrication and packaging of at least one microstructured molded part as one magazine/molded part composite, characterized by the following process steps: (a) replicative fabrication of the magazine (12) using an initially closed tool (5) which consists of at least one first and one second tool half (5a, 5b); (b) opening of both tool halves (5a, 5b), whereby the magazine (12) remains in the first tool half (5a); (c) replacing at least the second tool half (5b) with at least one additional tool half (5c); (d) replicative fabrication of at least one microstructured molded part (1, 3, 10) using the first tool half (5a) which contains the magazine (12) and the additional tool half (5c): and (e) simultaneous demolding of the magazine (12) and the molded part (1, 3, 10) as one magazine/molded part composite (15). This ensures a very cost-effective production of large quantities of the invented magazines with microcomponents. Furthermore, the preferred 2-component injection molding process allows the use of different mold materials for the replicative production of the microcomponents and the magazine. Of course, the microcomponents and the magazine may be made of the same mold material.

A special consideration of this invention is that after removal of the microcomponents, the magazine can be reused as prefabricated magazine according to the procedure for the replicative fabrication and packaging of at least one microstructured molded part as one magazine/molded part composite characterized by the following process steps: (a) replicative fabrication of at least one microstructured molded part (1, 3, 10) using a prefabricated magazine (12'); and (b) simultaneous demolding of he magazine (12') and the molded parts (1, 3, 10) as one magazine/molded part composite (15'). The emptied magazine will serve as a mold insert and provide a lateral boundary to set the outside shape of the microcomponent. Therefore, it is within the meaning of this invention to use another tool to form a different microcomponent with the same or a smaller circumference but different functions into the reusable magazine or to press it in using hot embossing.

Another special consideration of the invention is that the magazine can connect several molded parts with spaces in relation to each other. This way, several microcomponents can be placed in the invented magazine with reproduced alignment and high position and placement accuracy. This allows simultaneous mounting of many microcomponents with very small mounting tolerances, and therefore, optimizing the gripper paths and increasing the mounting speed.

Additional objectives, advantages, characteristics and application possibilities for this invention are depicted in the following description of several design examples in the drawings. All described and/or depicted features in themselves as well as in any meaningful combination are subject of this invention, regardless of their summary in the Claims or their cross-reference.

DETAILED DESCRIPTION OF THE INVENTION

Figure 1B:
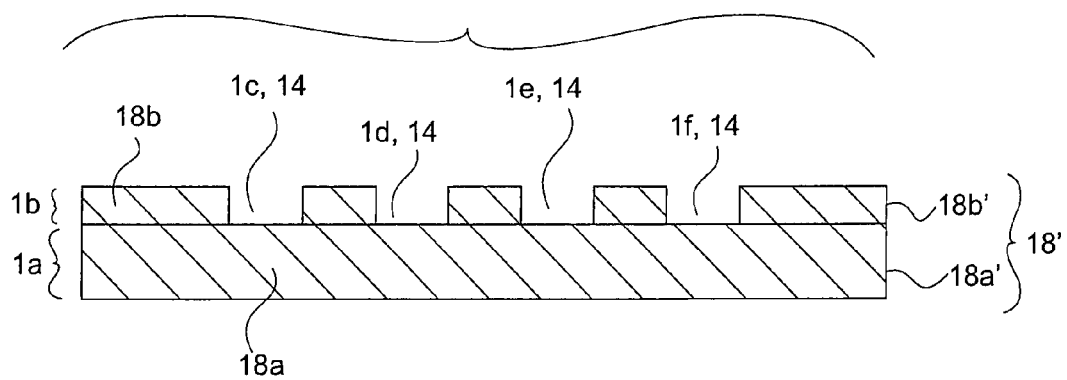
FIG. 1a) Top view, and b) cross-section of a microstructured component.
Figure 1A:
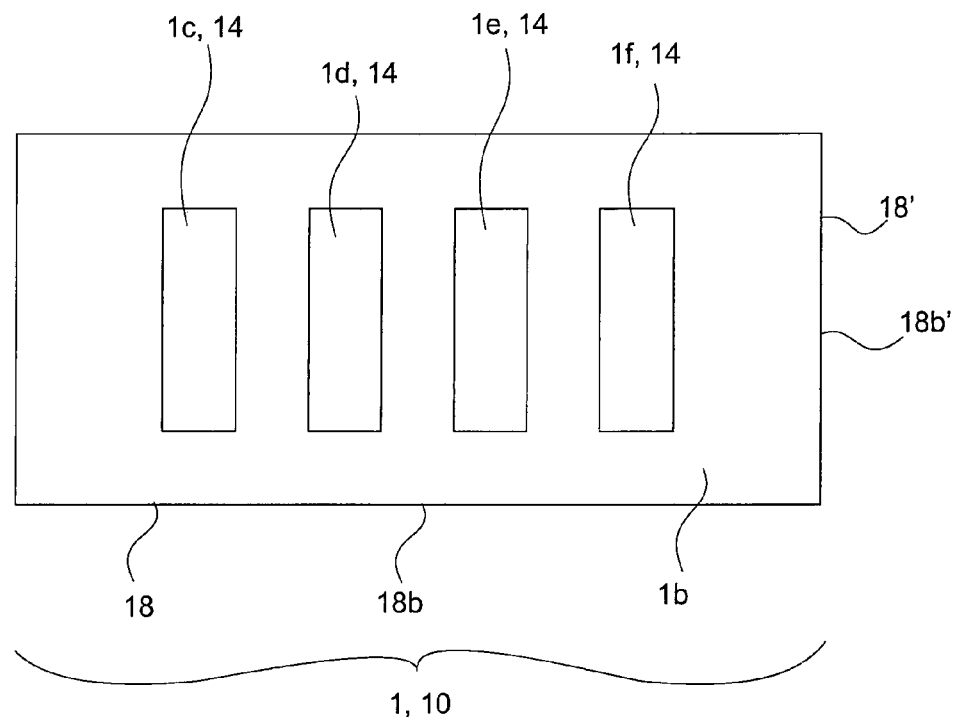

FIG. 1 shows a first design example of a microcomponent (1, 10) fabricated with the invented replicative procedure. This microcomponent (1, 10) has a rectangle shape with side surfaces (18 and 18') and consists of two functional parts (1a and 1b), an unstructured bottom part (1a) and a microstructured face (1b). The face (1b) contains four equally spaced microstructures (14) in form of sinks (1c-f). According to FIG. 1b, the side surfaces of the bottom part (1a) are referenced as 18a, 18a' and the face surfaces (1b) are referenced as 18b, 18b'.

FIGS. 2-6 show a preferred design of the invented procedure for replicative fabrication and packaging of preferably many microcomponents (1, 10) in consecutive process steps. Also shown is the preferred 2-component injection molding tool (4) for the invented procedure, consisting of two separate tool halves (4a, 4b). In this design example, tool half (4a) is designed as moving closure side for opening and closing both tool halves (4a, 4b) and connected to a closure device (not shown). Tool half (4b) is built as sprue gate and is connected with an injection molding machine (not shown).

Figure 2:
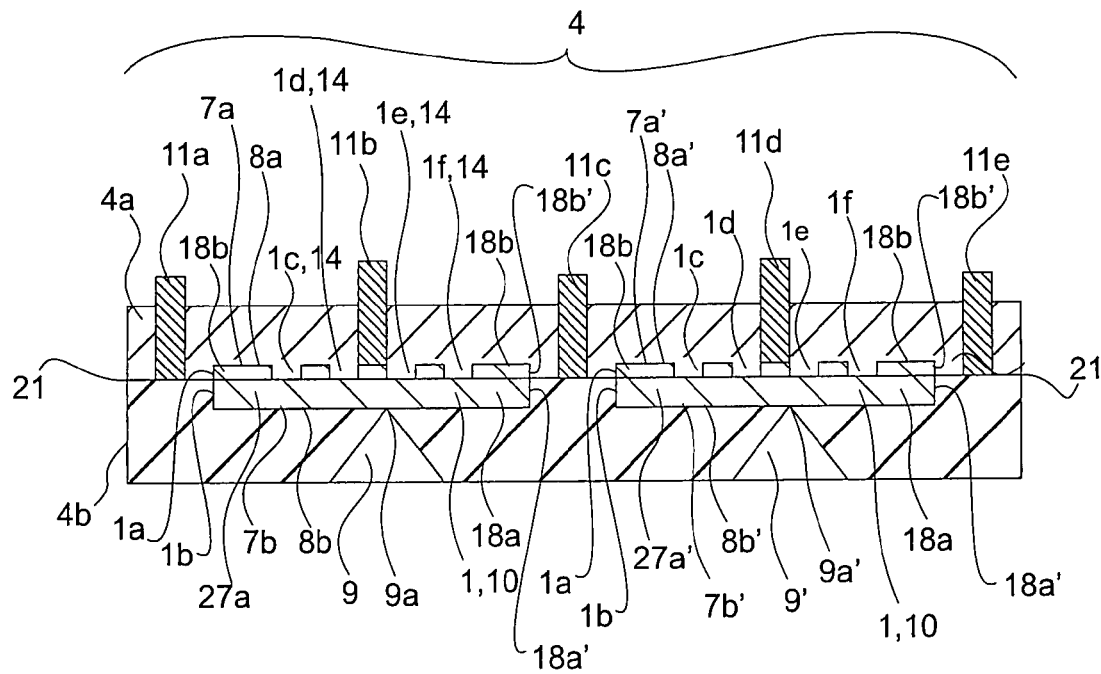
FIG. 2 Tool for the replicative production of the microcomponent shown in FIG. 1 according to fabrication of at least one microstructured molded part using an initially closed tool which consists of at least one first and one second tool half.

FIG. 2 shows the first step of the invented procedure for this design form, whereby the injection molding tool (4) is designed as multiple tool to allow replicative fabrication of several rectangle microcomponents (1, 10) as described above per injection cycle. The split injection molding tool (4) is in a tightly enclosed operating state, whereby both tool halves (4a, 4b) close together at one parting plane (21). In this design example, both tool halves (4a, 4b) include several appropriately spaced mold mounts (7a and 7a') on the closure side and several mold mounts (7b and 7b') on the sprue side. The design in this example allows the fabrication of four separate, equally spaced microcomponents (1, 10) in the injection molding tool (4) as shown in FIG. 7.

Figure 3:
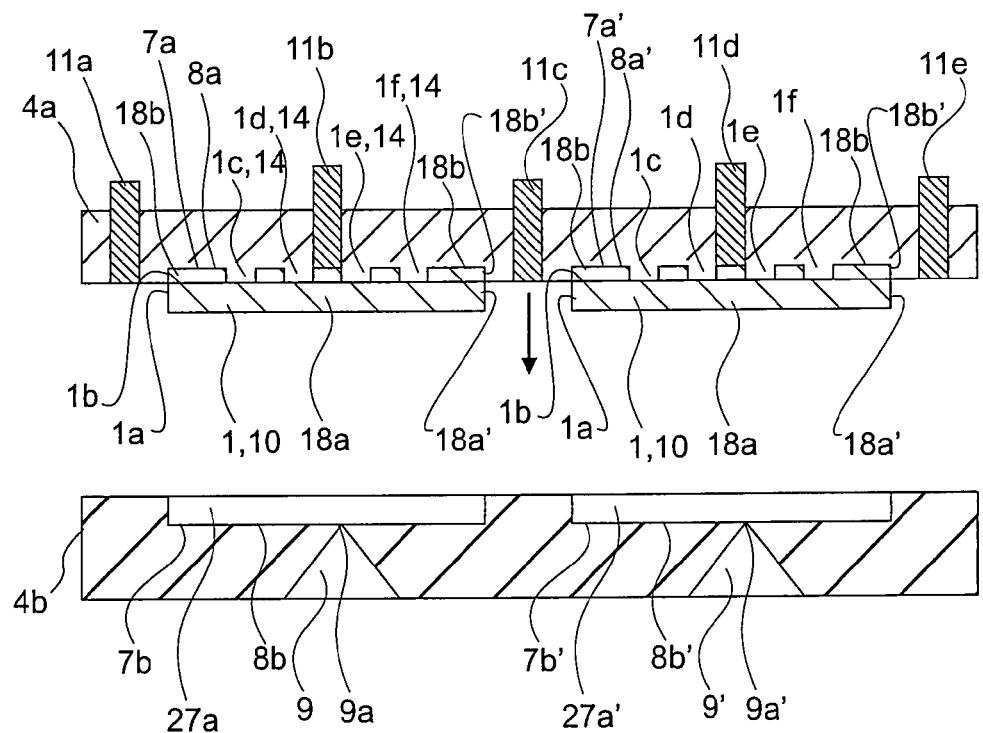
FIG. 3 Tool opening of both tool halves, whereby the molded part remains in the first tool half.

With the injection molding tool (4) the microcomponents (1, 10) are injection molded in one piece from the mold material. For replication of the face part (1b) with several microstructures (14), one microstructured mold insert (8a and 8a') is arranged in each of the closure-side mold mounts (7a, 7a'). For replication of the unstructured rectangle bottom part (1a), one mold insert (8b and 8b') is placed in the sprue-side mold mounts (7b, 7b'). In this example, the mold inserts (8b and 8b') are designed as trays (27a and 27a') as shown in FIG. 3.

For connection of the sprue-side tool half (4b) to the injection molding machine, the bottom of each tray (27a and 27a') is connected with one each sprue channel (9 and 9'). These sprue channels (9, 9') have a tapered cross-section (9a, 9a') towards the tray (27a, 27a') so that the mold material flows from the injection molding machine nozzle through a spreader system or sprue bush (not shown) in the respective sprue-side tray (27a, 27a') thus providing a separate flow opposite the respective closure-side microstructured mold insert (8a, 8a'). This ensures a uniform mold material distribution and filling of the trays (27a, 27a') and mold inserts (8a, 8a').

This special design form providing separate mold material injection into each mold insert (8a, 8a') for the fabrication of a microcomponent (1, 10) allows replication of microcomponents (1, 10) with microstructures (14) in the range of 10 micrometers. Furthermore, the component heights of the bottom parts (1a) of the four microcomponents (1, 10) are determined by the physical height of the tray-shaped mold inserts (7b, 7b') and the component height of the face parts (1b) is determined by the component height of the microstructured mold inserts (7a, 7a'). This allows a flexible replicative fabrication of microcomponents (1, 10), its functional parts (1a and 1b) as well as the microstructures (14) with different component heights.

For the microcomponent (1, 10) fabrication different plastic material can be used as mold material, e.g., polystyrene (PS), polypropylene (PP), polyethylene (PE), cyclo-olefin copolymer (COC), polymethyl methacylate (PMMA), polycarbonate (PC), polyoxymethylene (POM), polysulfone (PSU), polyphenyl ether (PPE), polyether ether ketones (PEEK), polyether-imide (PEI), polybutylene terephthalate (PBT), polyacrylate, self-reinforcing liquid crystalline polymers (LCP). These mold materials ensure a reproducible fabrication of the microcomponents (1, 10) in large quantities, whereby the selected mold material usually depends on the function of the finished microcomponent (1, 10). Additionally, the various physical characteristics of the mold material must be considered, e.g., strength, optical transparency, temperature resistance, and softening point as well as mold material shrinkage.

FIG. 3 shows the second process step of the selected design example. In this step, the injection molding tool (4) is opened until the tool halves (4a and 4b) are completely separated. As shown in FIG. 3, the already fabricated microcomponents (1, 10) remain in the closure-side separate and equally spaced microstructured mold inserts (8a, 8a'). According to FIG. 3, only the face parts (1b) of the microcomponents (1, 10) are in direct contact with the mold inserts (8a, 8a') and the bottom parts (1a) of microcomponents (1, 10) protrude freely from the tool half (4a).

Figure 4:
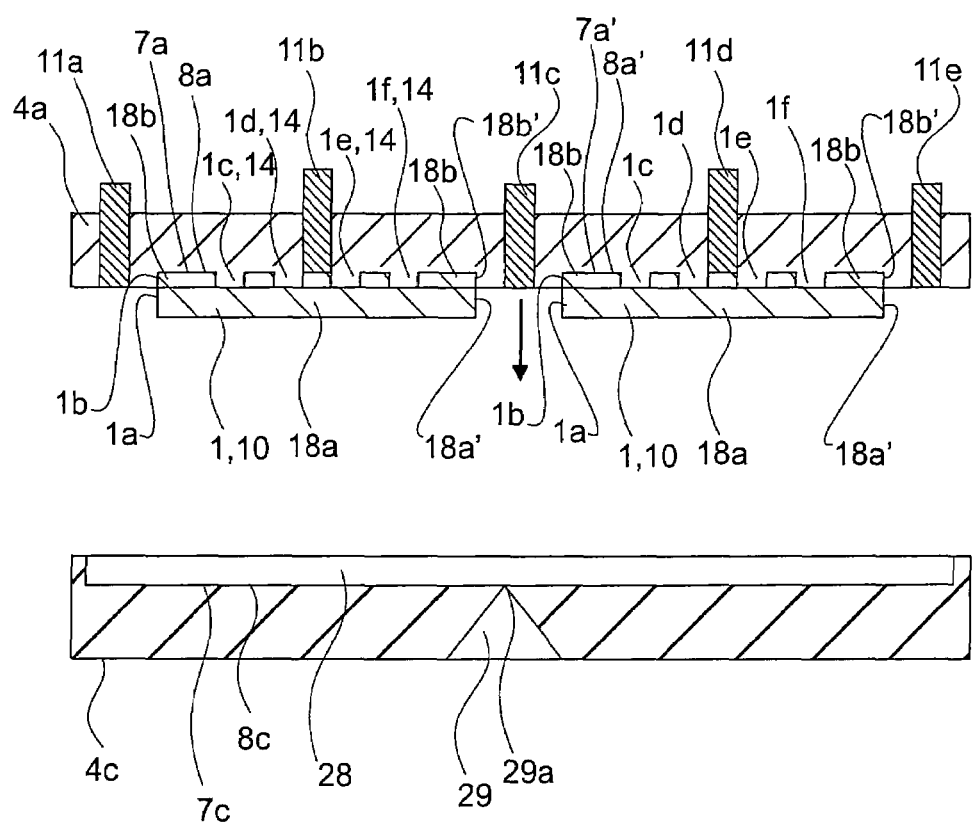
FIG. 4 Replacing at least the second tool half with at least one additional tool half.

In the subsequent third process step shown in FIG. 4, the sprue-side tool half (4b) is replaced with another sprue-side tool half (4c) as a comparison of FIG. 3 with FIG. 4 shows. This change of the sprue-side tool half is needed for the replicative fabrication of the invented magazine (12). For this purpose, tool half (4c) has another sprue-side mold mount (7c), which in this design example is designed as an unstructured tray (28) across the entire cross-section. At the tray bottom (28) there is another sprue channel (29) with gate (29a) to allow connection of the sprue-side tool half (4c) with the currently used or an additional second injection molding machine. In the first case, the currently used mold material will also be used to fabricate the magazine (12), and in the latter preferred 2-component injection molding process, the magazine (12) is made from a second mold material.

Figure 5:
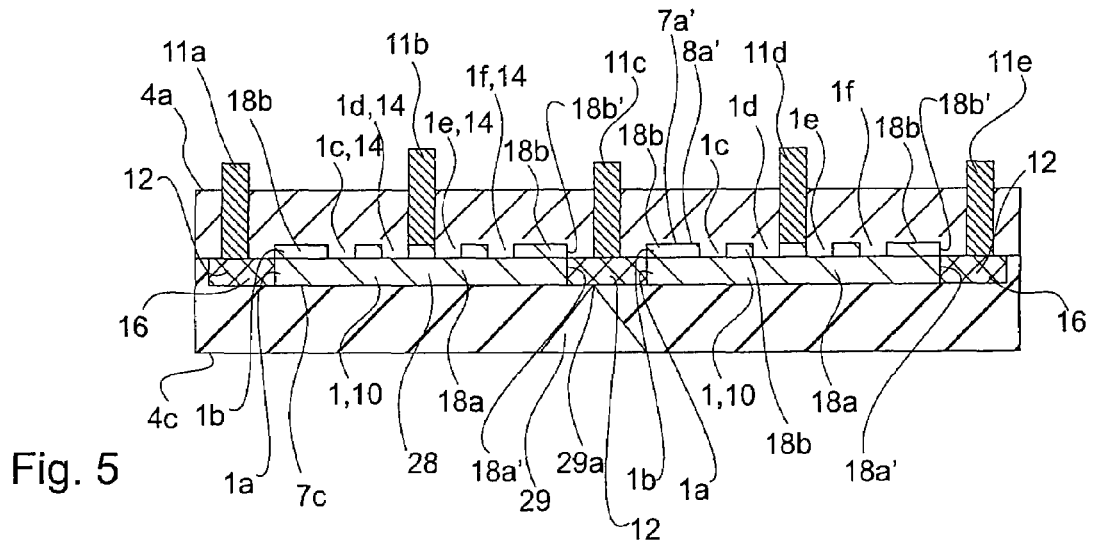
FIG. 5 Replicative fabrication of the magazine using the first tool half which contains the molded part and the additional tool half.

FIG. 5 shows the fourth process step for the replicative fabrication of the invented magazine (12). First, the two tool halves (4a and 4c) are closed. This closure of the injection molding tool (4) moves the sprue-side microstructured mold inserts (8a and 8a') that freely protrude from the bottom parts (1) of the microcomponents (1, 10) to the tray (28) into tool half (4c). The additional sprue channel (29) with gate (29a) that is connected with the bottom of the tray (28) is positioned between the microcomponents (1, 10) so that the mold material flows from the nozzle of the second injection molding machine into the tray (28) positively enclosing all exposed sides of the microcomponents (1, 10) in the tray (28). For this purpose, the cross section of the tray (28) has appropriate horizontal dimensions as shown in FIG. 5 to allow the fabrication of an overhang (16) of the magazine (12) over the microcomponents (1, 10) in order to create a magazine rim that can be freely provided with a profile pattern.

In this design example, the tray (28) is just high enough to conform to the physical height of the bottom surface (1a) of the microcomponent (1, 10). This way, only the bottom parts of the microcomponents (1, 10) are enclosed by the tray (28). This ensures that only the side surfaces (18a and 18a') of the bottom parts (a) are provided with a positive molding, whereas the side surfaces (18b, 18b') of the face part (1b) of the microcomponents (1, 10) remain exposed. This design of the magazine (12) provides the advantage that the microcomponents are only partially connected to the magazine (12), i.e., they are connected only to parts of the side surfaces (18, 18') of the microcomponent (1, 10) instead of the entire side surfaces (18, 18') of the microcomponent (1, 10). After demolding of the magazine (12) from the injection molding tool (4) according to FIG. 7, the microcomponents (1, 10) can be gripped at their 5 sides, in particular, by applying a mounting gripper to the exposed side surfaces (18b, 18b') of the face part (1b). This protects the microstructures (14) on the face (1b) during transportation, storage and mounting.

Another advantage of this partial connection of only small side surface sections of the microcomponents (1, 10) to the magazine (12) is that the contact surfaces between the magazine (12) and the microcomponents (1, 10) are reduced in comparison to a positive mold enclosure on all sides. This alone makes releasing the microcomponents (1, 10) from the magazine (12) much easier. However, this invention additionally improves the ease of removing the microcomponents (1, 10) from the magazine (12) by allowing that suitable combinations of two mold materials can be used for fabricating the microcomponents (1, 10) and the magazine (12).

For the magazine (12) fabrication the preferred materials are thermoplastics, like polyoxymethylene (POM), polymethyl methacylate (PMMA), polycarbonate (PC), polyamide (PA), or polyethylene (PE). The amorphous thermoplastics can be used to produce transparent magazines, and liquid crystalline thermoplastics can be used to produce opaque magazines. Another special design provides that the magazine consists of elastomer plastics. Further special designs provide that the magazine (12) consists of plastic with bound metal components, graphite components, or a plastic material with ceramic components. The use of plastic with bound metal components allows the use of a magnet gripper for gripping the magazine (12).

Figure 6:
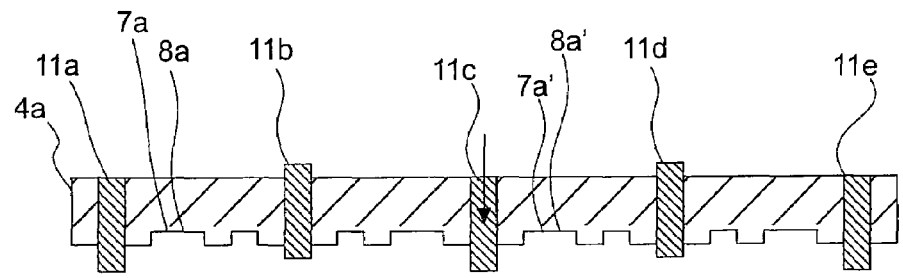
FIG. 6 Tool opening and simultaneous demolding of the magazine and the molded part with several microcomponents as one magazine/molded part composite.
Figure 6:
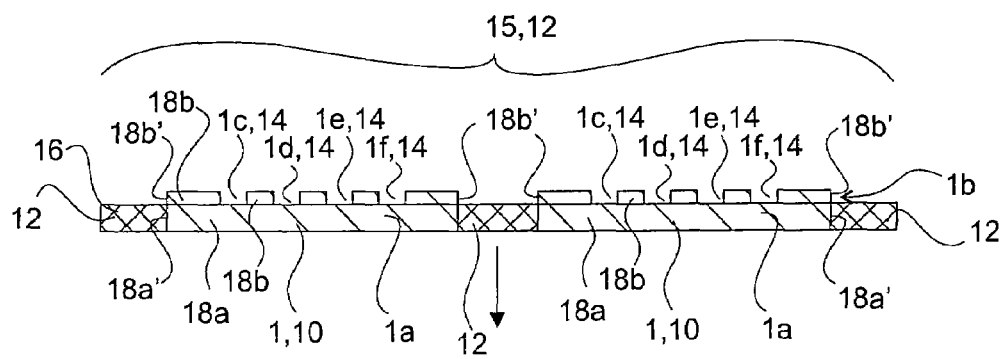
Figure 6:
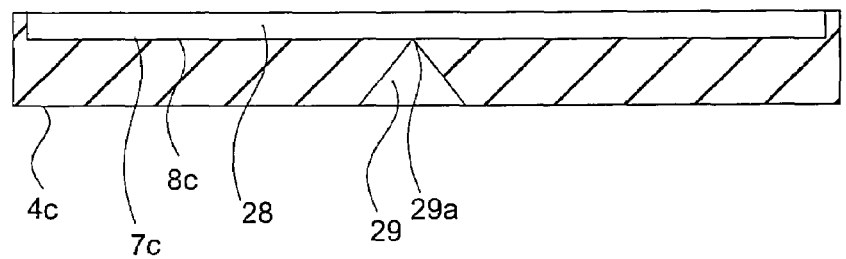

FIG. 6 shows the fifth and last process step, whereby the magazine (12) with the molded in microcomponents (1, 10) is demolded as one magazine/molded part composite (15). For this step, first the injection molding tool (4) is opened by moving the closure-side tool half (4a) into its open position. During opening, the magazine (12) with the microcomponents (1, 10) remains as one magazine/molded part composite (15) inside the closure-side microstructured mold inserts (8a and 8a'). Then the magazine/molded part composite (15) will be demolded from the mold inserts (8a and 8a') in the direction of tool half (4c) using several moving ejector pins (11a-e) that are mounted to tool half (4a).

Figure 7B:
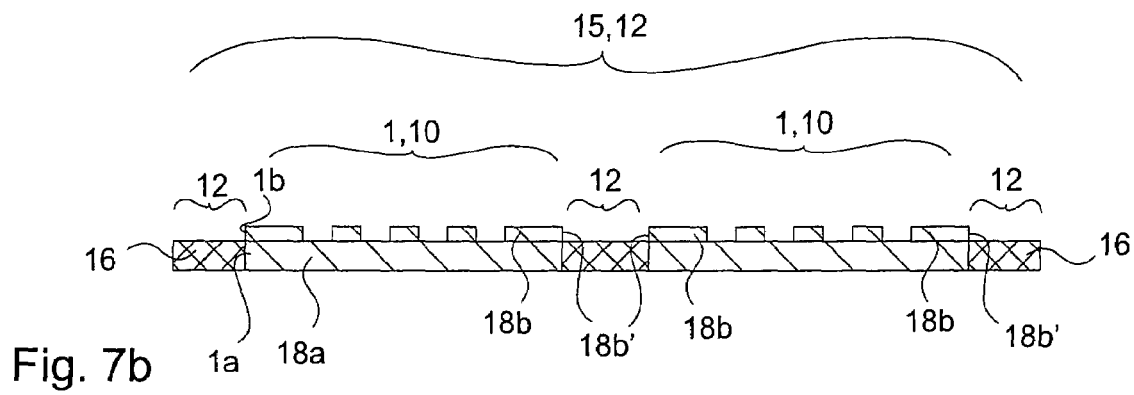
FIG. 7a) Top view, and b) cross-section of the magazine according to FIG. 6.
Figure 7A:
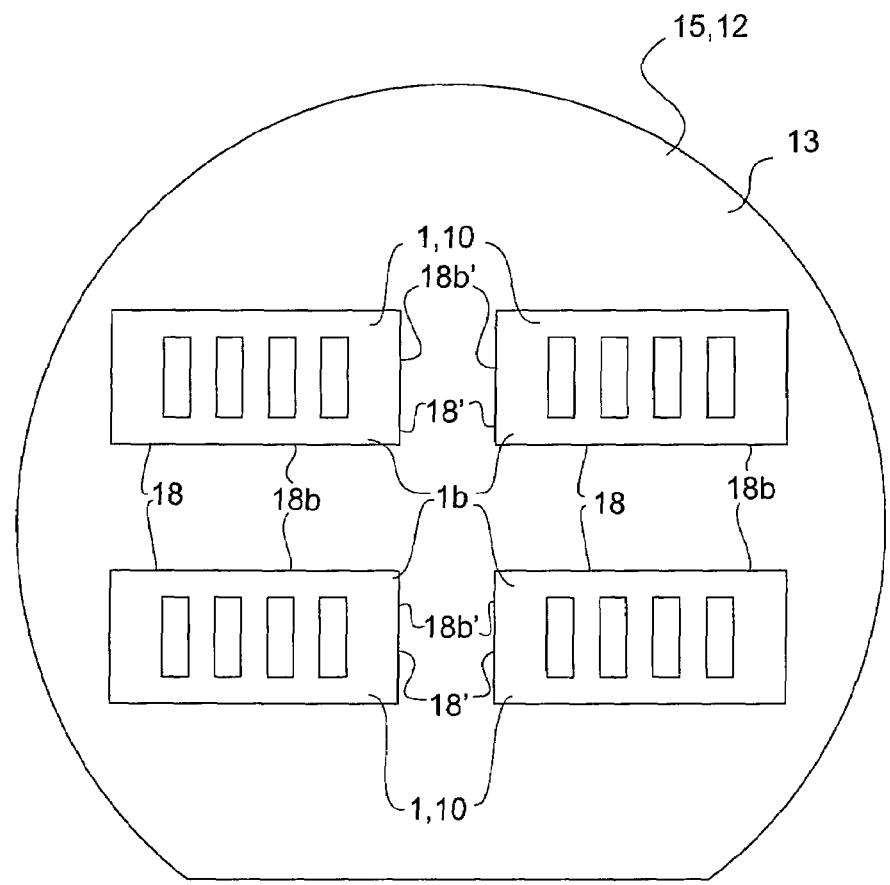

FIGS. 7a and 7b show the top view and a cross-section of the magazine (12) with microcomponents (1, 10) as one magazine/molded part composite (15) directly after demolding from the injection molding tool (4). The figure depicts a very special advantage of the invented procedure, namely that no after-treatment of the magazine (12) is required before mounting the microcomponents (1, 10). Within the invention this is achieved, because the injection molding tool (4), and in particular, the mold inserts (8a and 8a') inside the tool firmly set the ordered state of different microcomponents (1, 10) with defined positioning and spacing. Since the replicative fabrication of the magazine (12) is preferably performed directly afterwards in a tool fixture, very precise placing and positioning tolerances can be achieved for the microcomponents (1, 10) and the magazine (12) so the positions and the relative places of the microcomponents (1, 10) are precisely known immediately after fabricating the invented magazine (12) and before mounting the microcomponents. Based on this, very precise and fully automated mounting of a multitude of microcomponents (1, 10), preferably using a mounting gripper, can be achieved with comparably very precise mounting tolerances and low cost. The use of a mounting gripper additionally improves mounting precision, since it ensures safe and quick gripping of the microcomponents (1, 10).

FIG. 7 shows that the magazine (12) is built in the form of a wafer in this design example. This wafer form (13) allows connection to a production line and the systems in the semiconductor industry for further processing of the magazine (12) and/or the microcomponents (1, 10). For example, the microcomponents (1, 10) and/or the magazine (12) could be coated in a sputter system. FIG. 7b shows how the microcomponents (1, 10) can be removed on either side of the magazine (12) in this design example. This allows a second preferred mounting type for the microcomponents (1, 10), whereby the microcomponents (1, 10) can be pressed out of the magazine (12) by hand or by machine.

A special advantage of the invented procedure for the fabrication of the invented magazine (12) is that different vertical dimensions can be produced for the microcomponents (1, 10) and the magazine (12). FIG. 7b shows the magazine (12) in this design example with a lower physical height than the microcomponents (1, 10).

Figure 8:
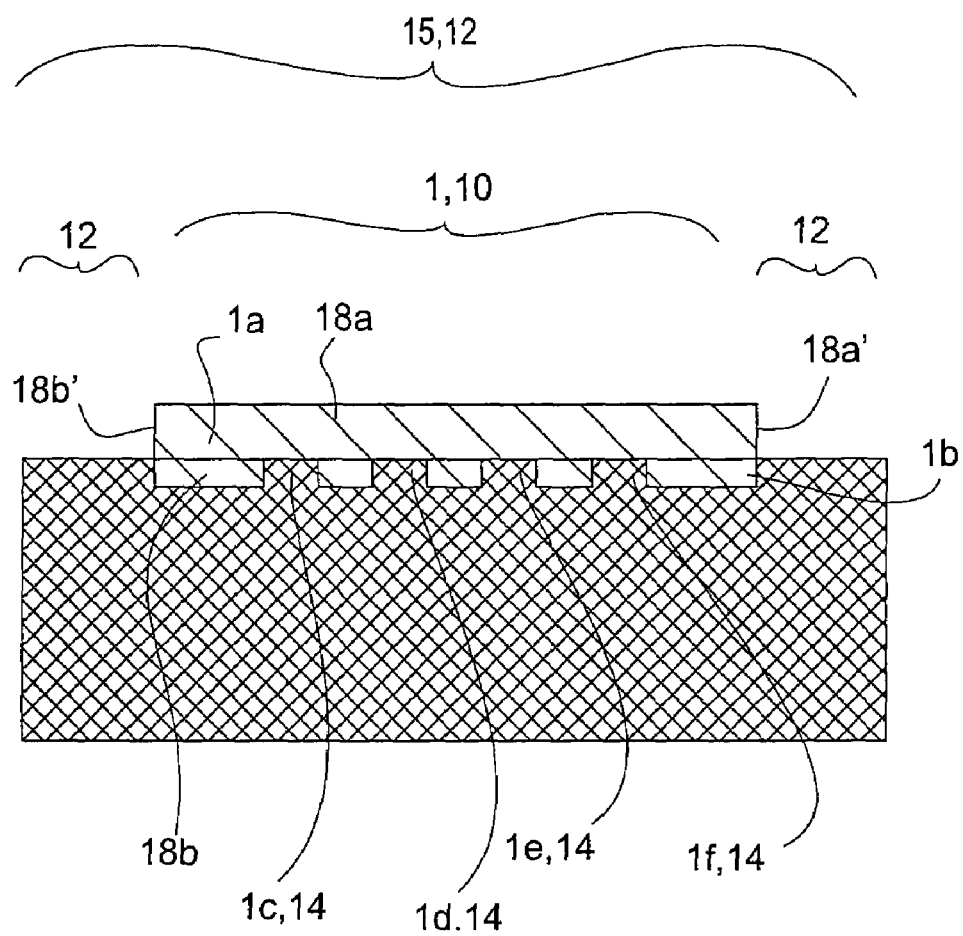
FIG. 8 Cross-section of a section of the magazine, whereby the magazine connects to the microstructures of the microcomponent from FIG. 1 and is higher than the microcomponent.

FIG. 8 shows the cross-section of an area in another special design example for the invented magazine (12), whereby the magazine (12) has a significantly higher physical height than the microcomponents (1) and only connects to the microstructures (14) of the face part (1b) of the microcomponents (1, 10). In this design example, the side surfaces (18a, 18a') of the microcomponent (1, 10) bottom parts (1a) are exposed inside the magazine and easily can be gripped with a mounting gripper. This design form is used to protect the microstructures (14) on the face part (1b) which are arranged in form of sinks (1c-f) and to improve the stability and handling of the magazine (12).

To fabricate this design form of the invented magazine (12) an modified injection molding tool is required, whereby only the bottom parts (1a) are fabricated in the closure-side tool half (4a), and the face parts (1b) with microstructures (14) are made in the sprue-side tool half (4b). For this design, the microstructured mold inserts (8*a*, 8*a*') are placed in the sprue-side mold mount (7*b*, 7*b*'), and the tray-shaped mold inserts (8*b*, 8*b*') are inserted in the closure-side mold mounts (7*a*, 7*a*'). When replacing the sprue-side tool half (4*b*) with another tool half (4*c*) with tray (28), it must be ensured that the microcomponents (1, 10) will now remain in the tray-shaped mold inserts (8*b*, 8*b*') and not as before in the microstructured mold inserts (8*a*, 8*a*'). This can be achieved by placing appropriately more ejector pins (11) into the sprue-side tool half (4*b*) which in this case only serve to detach the microcomponents (1, 10) after their fabrication. Finally, for the replicative fabrication of the magazine (12) according to FIG. 8, the physical height of the replaced tray (28) in the additional tool half (4*c*) must be higher in comparison to the microstructures (14) of the microcomponents (1, 10) protruding from the closure-side tray-shaped mold inserts (8*b*, 8*b*').

Figure 9B:
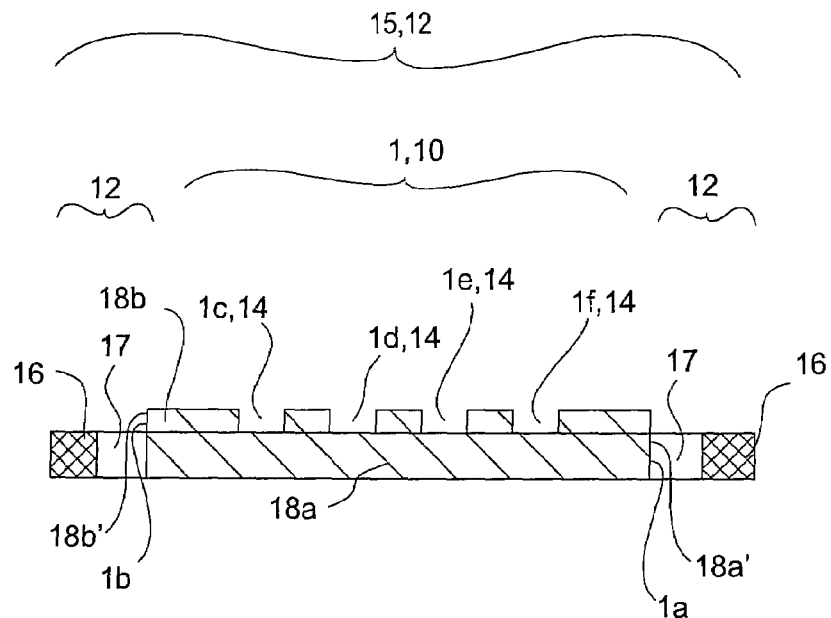
FIG. 9 a) Top view, and b) cross-section of a magazine section according to FIG. 7 with recesses arranged at the sides of the microcomponents inside the magazine.
Figure 9A:
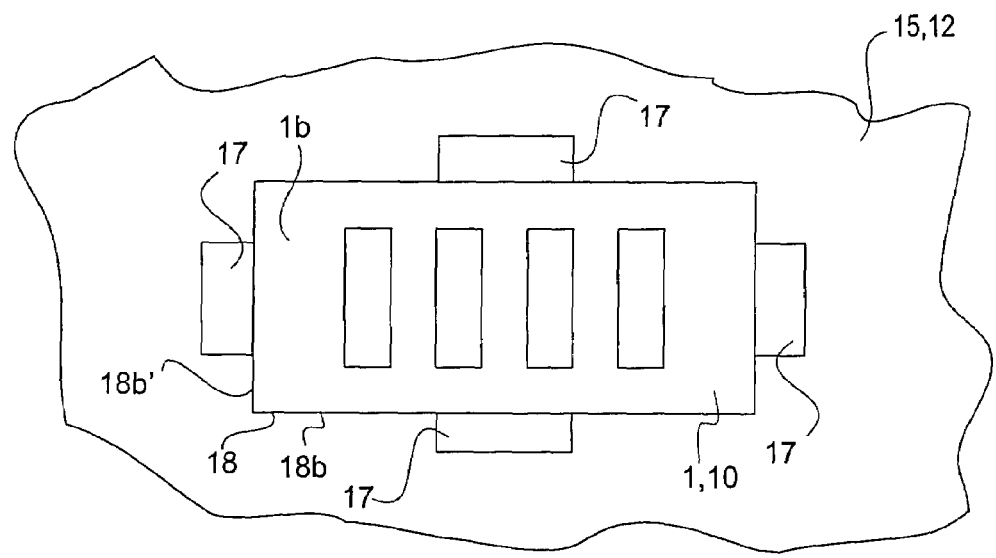

FIG. 9*a* shows the top view and FIG. 9*b* shows a cross-section of an area of another design example of the invented magazine (12) with microcomponents (1, 10) in form of one magazine/molded part composite (15), whereby the magazine (12) only connects to the bottom parts (1*a*) of the microcomponents (1, 10), but different from the design in FIG. 7, includes several recesses (17). In this design example, two each recesses (17) are located opposite to each other and directly adjoining the side surfaces (18*a*, 18*a*') of a bottom part (1*a*) of the microcomponent (1, 10). According to FIG. 9*b* the recesses (17) have the same height as the magazine's (12) physical height and are formed as free spaces, i.e. spaces without mold material fill within the magazine (12). This design form with recesses (17) improves the fully automated use of a mounting gripper, since the gripper can grip the microcomponents (1, 10) across the entire side surface (18, 18') in the recess (17) area, and, if necessary, even at the underside of the bottom part (1*a*). In another design form (not shown), the recesses (17) have different heights than the magazine's (12) physical height and are built like cavities or pockets within the magazine (12) so that at least some side surfaces of the microcomponent (1, 10), e.g. parts of the bottom part (1*a*) side surfaces (18, 18'), connect to the magazine (12). These recesses or pockets (17) can also be used to hold the microcomponents (1, 10) during transportation and storage.

Another advantage of this design form for the invented magazine (12) with recesses (17) is that the contact surfaces and therefore the adherence forces between the magazine (12) and the microcomponents (1, 10) are considerably reduced in comparison to a positive connection according to FIG. 7. This facilitates and simplifies release of the holding contact between magazine (12) and microcomponents (1, 10) during mounting of the microcomponents (1, 10). Additionally, the reaction forces on the usually sensitive mounting grippers will be reduced, allowing higher gripper speeds and subsequently shorter mounting cycles.

For fabrication of this design form for the invented magazine (12) with recesses (17), a modified injection molding tool is needed, whereby in contrast to FIG. 4 one tool half (4*c*) is replaced with a structured tray (28) containing negative forms like steps, columns, walls, etc., for the replicative fabrication of the magazine (12). A simple variation of the negative forms allows fabrication of the recesses (17) with any height in comparison to the physical height of the microcomponents (1, 10). The recesses (17) may also be fabricated in a way where only one side or a part of one side of the microcomponent (1, 10) is connected to the magazine (12). Another option is to provide a large enough recess (17) within the magazine (12) that adjoins one side of the microcomponent (1, 10) so that the microcomponent (1, 10) can be removed through this recess (17) in its entirety from the magazine (12).

By using one tool half (4*c*) with a structured tray (28) for the replicative fabrication of a magazine (12) including negative forms like steps, columns, walls, etc., the magazine (12) may be molded to a microcomponent (1, 10) at any physical height and at any parts of the side surfaces.

Figure 10B:
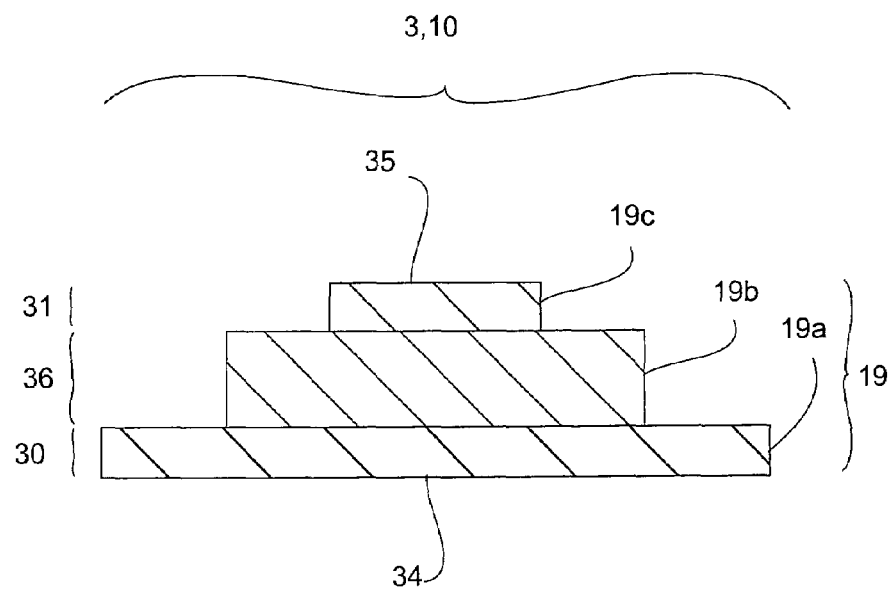
FIG. 10 a) Top view, and b) cross-section of a two-stage micro gear wheel.
Figure 10A:
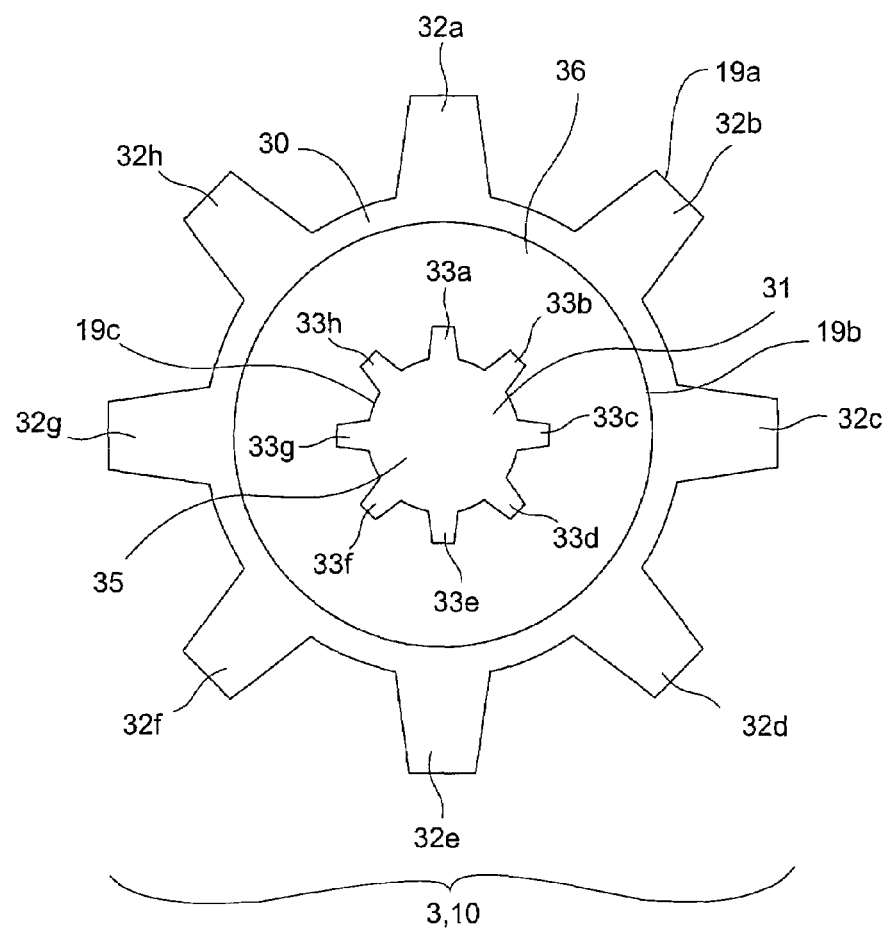

FIG. 10*a* shows a top view and FIG. 10*b* shows a cross-section of a second, more complex design example for a microcomponent (1, 10) fabricated with the invented procedure in form of a 2-step micro-gear (3). For the fabrication of this micro-gear (3, 10), microstructured mold inserts were used in the closure-side mold mount (7*a*, 7*a*') and also in the sprue-side mold mount (7*b*, 7*b*'). Both FIGS. 10*a* and 10*b* show that the micro-gear (3, 10) tapers from the first step consisting of a micro-gear (30) with several teeth (32*a-h*) across an unstructured step part (36) towards the second step consisting of a micro-gear (31) with several teeth (33*a-h*). According to FIG. 10*b*, the side surface of the microcomponent (3, 10) has the reference number (19), the part with the side surface of the micro-gear (30) is referenced as (19*a*), the side surface of the step part is referenced as (19*b*), and the side surface of the micro-gear (31) is referenced as (19*c*).

Figure 11B:
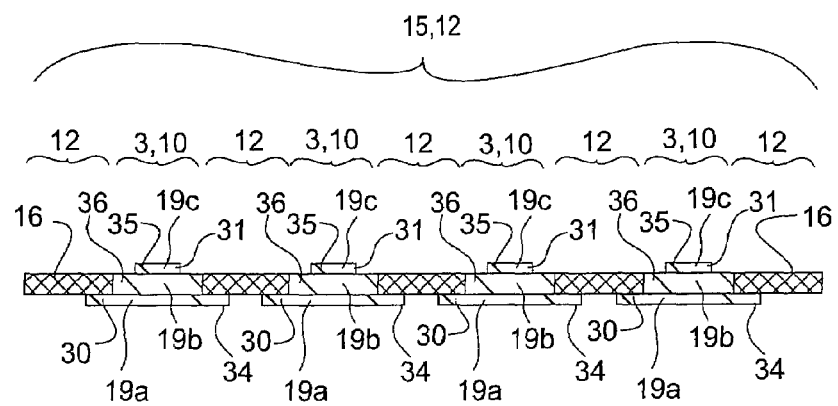
FIG. 11 a) Top view, and b) cross-section of a magazine with several micro-gears according to FIG. 10 as one magazine/molded part composite.
Figure 11A:
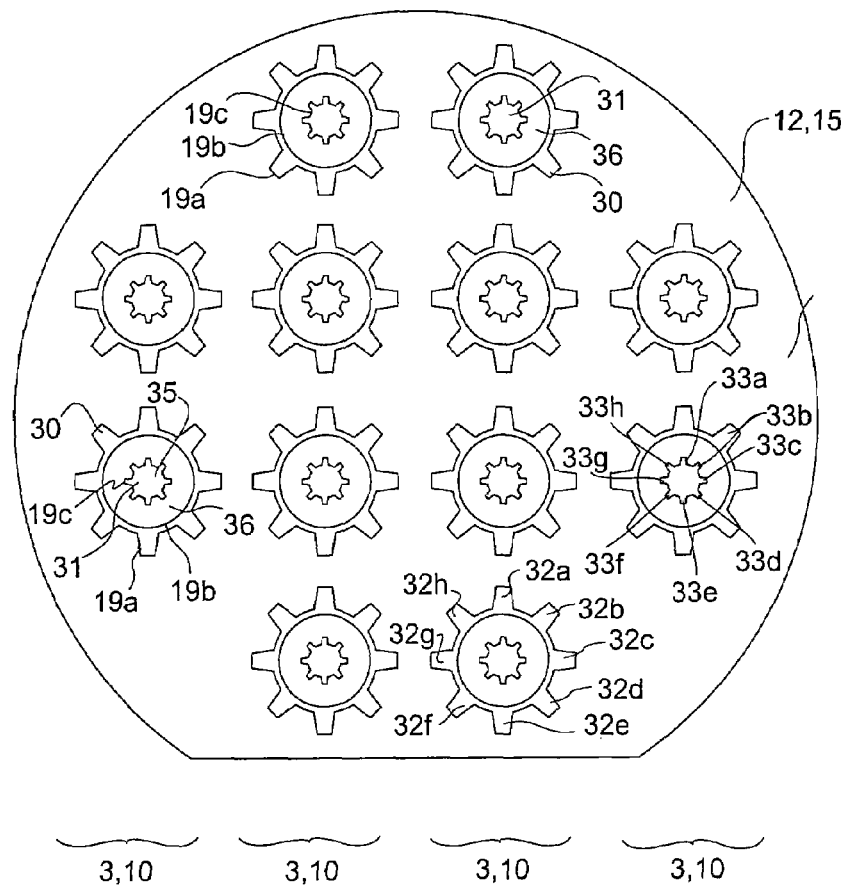

FIGS. 11*a* and 11*b* show another design example of the invented magazine (12) with several microcomponents (3, 10) as one magazine/molded part composite (15), whereby the magazine (12) connects positively only at the physical height and at the side surfaces (19*b*) of the step part (36) of these micro-gears (3, 10). For the fabrication of these micro-gears (3, 10), two microstructured mold inserts were used in a way where only the micro-gears (31) of the second step of the micro-gear (3, 10) remained in contact with the closure-side microstructured mold inserts (8*a*, 8*a*') during opening of the injection molding tool (4), while the step part (36) and the micro-gears (30) of the micro-gears (3, 10) first step freely protrude from the closure-side tool half (4). Subsequently, for the fabrication of the partial connection of the magazine (12) shown in FIG. 11*b*, a structured tray (28) with several appropriately spaced negative forms of the micro-gear (30) was used, whereby the physical height of this tray (28) was adapted to the total component height of the step parts (36) and micro-gears (30) protruding from the closure-side mold inserts (8*a*, 8*a*'). This ensures protection of both micro-gears (30 and 31) and their microstructures (14) consisting of teeth (32*a-h* and 33*a-h*), since their side surfaces (19*a* and 19*c*) cannot be molded to the magazine (12) and therefore will be exposed after demolding this magazine (12). Since in this design of the magazine (12), the tapered micro-gears (3, 10) can be removed from the magazine (12) in one direction only, i.e. in the direction of the larger micro-gear (30), removal or mounting of the microcomponents (3, 10) from the magazine (12) should preferably accomplished by pressing on the face (35) of the smaller micro-gear (31) to move the microcomponents with appropriately positioned magazine (12) into the mounting position.

Of course it is possible to make the physical height of the structured tray (28) higher than the microcomponent (1, 10) sections protruding from the closure-side mold inserts (8*a* and 8*a*') so that the magazine (12) can be fabricated with a significantly larger physical height than the microcomponents (10).

Figure 12B:
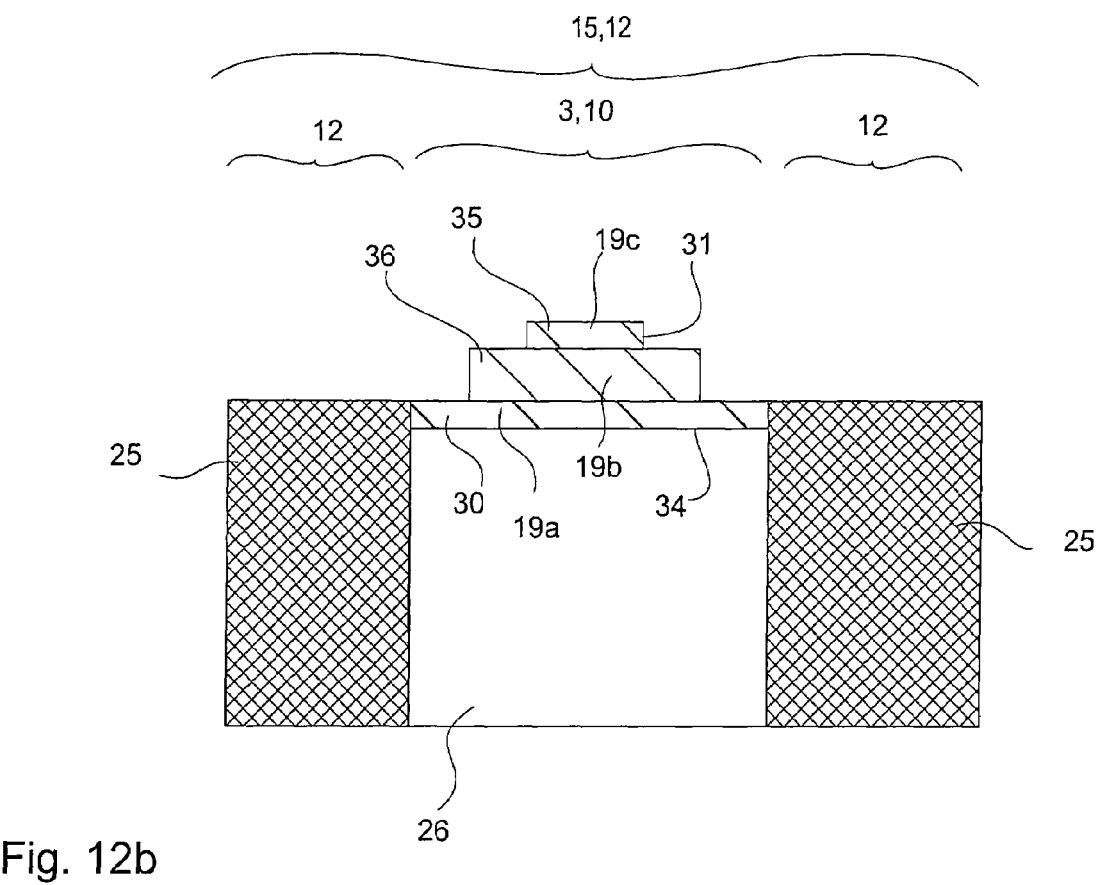
FIG. 12 a) Top view, and b) cross-section of a magazine section, whereby the magazine connects to the first step of the micro-gear according to FIG. 10 and is higher than the micro-gear.
Figure 12A:
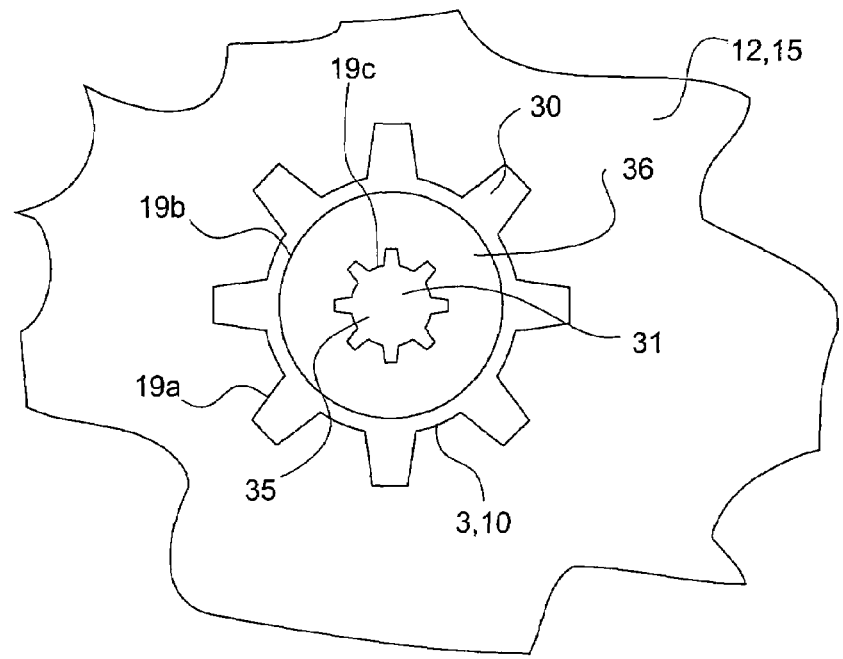

FIGS. 12*a* and 12*b* show another design example for the invented magazine (12) including several microcomponents (3, 10) as one magazine/molded part composite (15), whereby the magazine (12) has a clearly higher physical height than the microcomponents (3, 10) and where it connects positively only at the physical height of the first step of these micro-gears (3, 10), in particular at the side surfaces (19a) of the micro-gear (19). This design form provides protection for the micro-gear (30) teeth (32a-h) and ensures improved stability of the magazine (12) and subsequently improved handling of the magazine during transportation, storage and mounting.

As shown in FIG. 12, this design form for the magazine (12) provides that the magazine (12) walls (25) below the microcomponent (3, 10) form a channel (26). During mounting of the microcomponents (3, 10) and their pressing out of the magazine (12), this channel (26) serves as guide. For example, a gripper moves the magazine (12) over the mounting position and then the microcomponent (3, 10) will be pressed out. The microcomponent (3, 10) will slide in the desired ordered state through the channel (26) so no readjustment of the final position will be required.

The invented procedure also allows the fabrication and packaging of complex microcomponents (10) with undercuts. For fabrication of this design form of the invented magazine (12), a modified injection molding tool is needed, whereby preferably jaw tools or pushers should be used in the injection molding tool; these jaws or pushers should traverse vertically to the closure movement of tool half (4a) and subsequently create more separation levels inside the injection molding tool (4) in addition to the already described separation level (6). This design form allows simultaneous demolding of these microcomponents (10) and the magazine (12) as one magazine/molded part composite (15). One design form for the magazine (12) holding complex microcomponents (10) with undercuts is that only one side or one part of a side of this microcomponent (10) connects to the magazine (12), and that the magazine (12) which adjoins the other side of this microcomponent (10) has a recess (17) with a large enough cross-section where the entire microcomponent (10) can be removed from the magazine (12) through this recess (17). Another option for packaging these microcomponents (10) with undercuts in the magazine is to connect only the larger side surfaces of these microcomponents (10) to the magazine (12). Another option for packaging these microcomponents (10) in the magazine is to connect them at the bottom or face surfaces to the magazine (12) as shown in the following design examples.

Figure 13B:
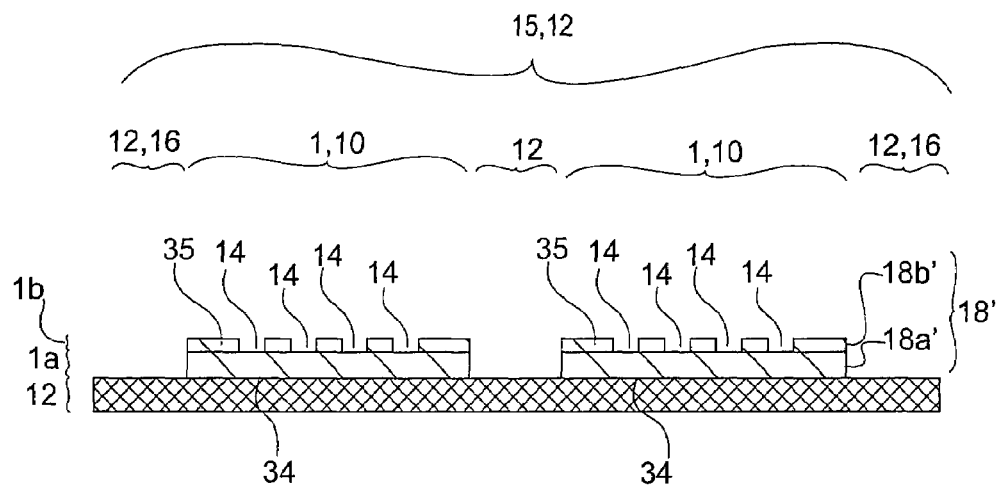
FIG. 13 a) Top view, and b) cross-section of a magazine with several microcomponents according to FIG. 1 as one magazine/molded part composite, whereby the magazine connects to the bottom parts of the microcomponent.
Figure 13A:
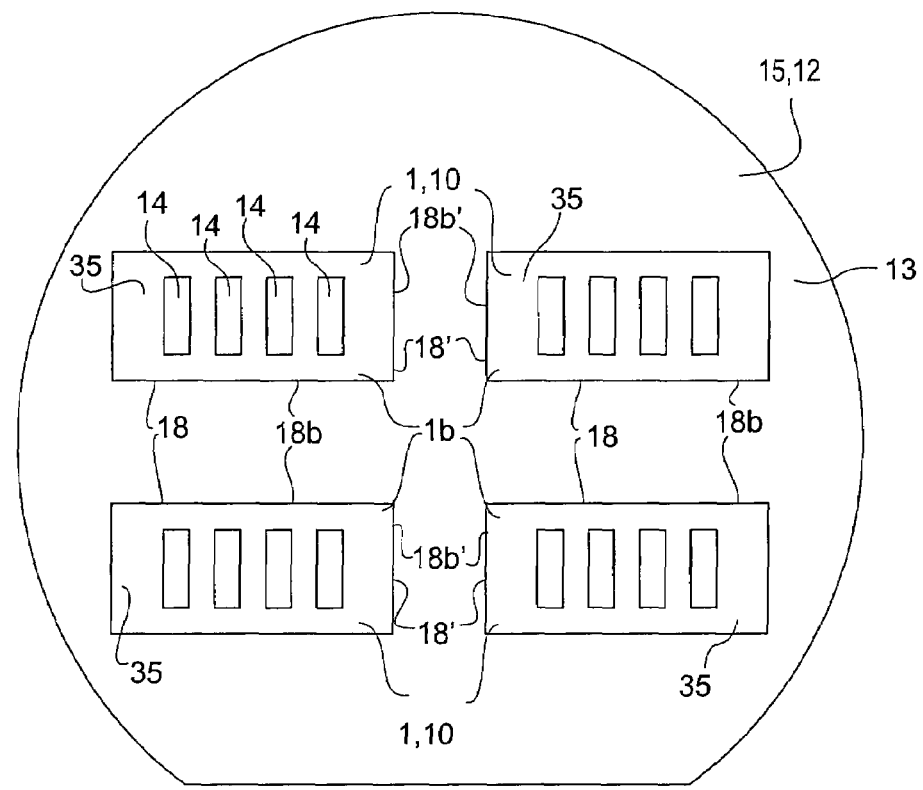

FIG. 13a shows a top view and FIG. 13b a cross-section of another design example for the invented magazine (12) with microcomponents (1, 10) as one magazine/molded part composite (15), whereby the magazine (12) connects to the microcomponents (1, 10) across the entire bottom surface (34) of the bottom part (1a) so that the microcomponents (1, 10) rest or sit in the magazine (12). The special advantage of this design is that the mounting gripper can grip the microcomponent (1, 10) across the entire side surfaces (18, 18'), i.e. on the side surfaces (18, 18') of the bottom part as well as on the side surfaces (18b, 18b') of the face part (1b), since these surfaces are not connected to the magazine (12). Furthermore, this allows packaging of microcomponents (10) without suitable surfaces for replicative fabrication processes and connection to the magazine (12), like microcomponents (10) with concave or convex side surfaces. Additionally, this design for the invented magazine (12) provides protection for the microstructures (14) of the microcomponents (10), since the magazine (12) connects the microcomponents (1, 10) at the unstructured bottom surface (34) of the bottom part (1b) opposite the microstructures (14). If the bottom part (1a) of a microcomponent (10) has microstructures (14), the magazine (12) can also be fabricated replicatively on the opposite side of the face (35) of a microcomponent (14). Resting of the microcomponents (1, 10) on the magazine (12) is accomplished by the invented holding contact, whereby preferably a physical holding contact is created through surface roughness or thermally initiated incipient fusion between both molded parts.

Figure 14B:
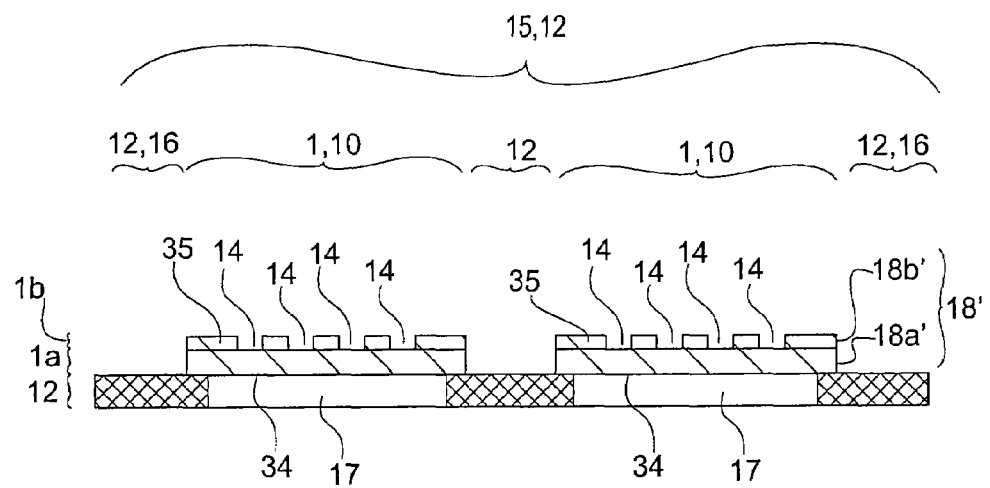
FIG. 14 a) Top view, and b) cross-section of a magazine according to FIG. 13 with recesses arranged below the microcomponents inside the magazine.
Figure 14A:
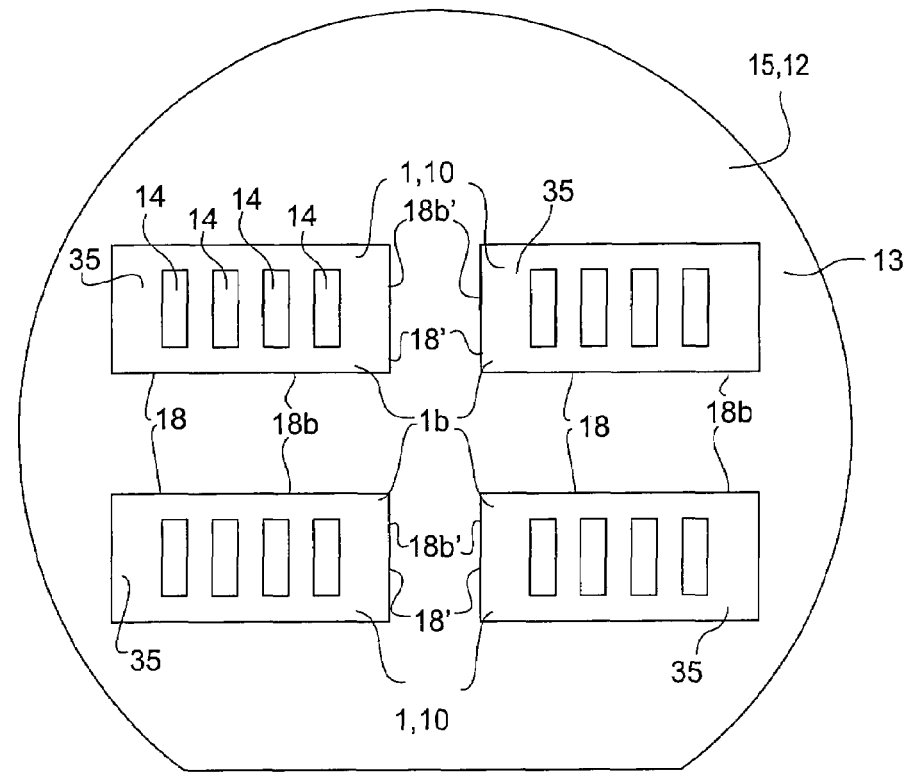
Figure 15:
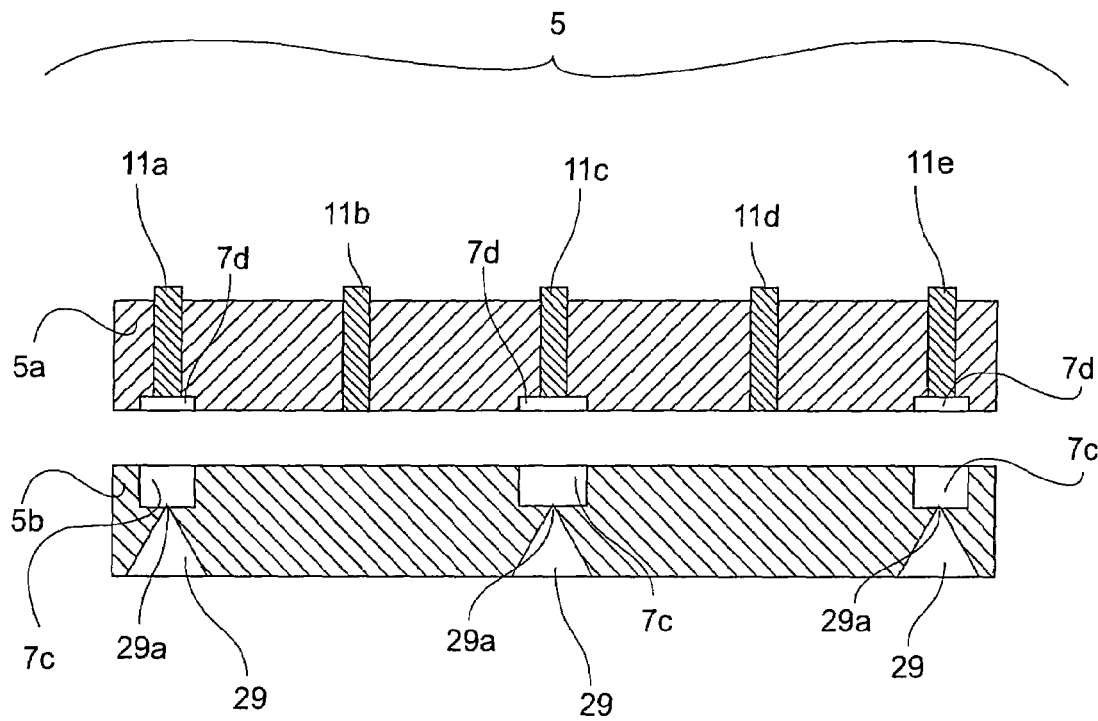
FIGS. 15 to 19 show a tool for replicative fabrication of a magazine/molded part composite in various process steps.

FIGS. 14a, b show another option of the invented magazine (12) with microcomponents (1, 10) as one magazine/molded part composite (15), whereby the magazine (12) connects the microcomponents (1, 10) only at parts of the bottom surface (34) of the bottom parts (a) in contrast to the design form described above. In this design example, the magazine (12) has one each recess (17) directly adjoining the bottom surface (34) of the bottom part (1a) as shown in FIG. 14b, so that only parts and not the entire bottom surface (34) is connected by holding contact with the magazine (12). In comparison to the design in FIG. 13, this option reduces the contact surfaces between the magazine (12) and the microcomponent (1, 10) resulting in less force required for the release of the microcomponents (1, 10) during mounting. Additionally, mounting by pressing out the microcomponents (1, 10) is improved, since only a light pressure on the part of the bottom surface (34) of the bottom part (1a) that is not connected to the magazine (12) will be required to release the microcomponent.

For the fabrication of the designs for the invented magazines (12) in FIGS. 13 and 14, where the microcomponents (1, 10) rest on the magazine (12), the injection molding tool must be modified in two ways in comparison to FIG. 4. First, the tool half (4a) and the included closure-side mold mount (7a, 7a') must be designed in a way where the microcomponent (1, 10) after its fabrication completely remains in the first injection mold. Subsequently, the tool half (4c) in FIG. 4a with an unstructured tray (28) will be used for replicative fabrication of the magazine (12). For the fabrication of the magazine according to FIG. 14, a structured tray (28) (not shown) will be used, whereby negative forms, like columns or stamps, rise up from the bottom of the tray (28) matching the finished microcomponents (1, 10) and where their height conforms to the physical height of the tray (28).

As the already depicted design examples show, the invented procedure for replicative fabrication and magazine packaging of preferably several microcomponents (1, 3, 10) provide high flexibility for the fabrication of the invented magazine (12), since all dimensions of the magazine (12), in particular its physical height, can be defined by the exact design of the injection molding tool (4). Therefore, it is within the meaning of this invention to first carry out the replicative fabrication of the invented magazine (12), followed by the microcomponents (1, 3, 10), which then can be molded, into the defined magazine (12). The individual process steps of this modified invented procedure are characterized by the following process steps: (a) replicative fabrication of the magazine (12) using an initially closed tool (5) which consists of at least one first and one second tool half (5a, 5b); (b) opening of both tool halves (5a, 5b), whereby the magazine (12) remains in the first half (5a); (c) replacing at least the second tool half (5b) with at least one additional tool half (5c); (d) replicative fabrication of at least one microstructured molded part (1, 3, 10) using the first tool half (5a) which contains the magazine (12) and the additional tool half (5c); and (e) simultaneous demolding of the magazine (12) and the molded part (1, 3, 10) as one magazine/molded part composite (15). For this procedure, the various design forms of the injection molding tool preferably should be used also.

The procedure namely, the replicative fabrication and packaging of at least one microstructured molded part ad one magazine/molded part composite, characterized by the following process steps; (a) replicative fabrication of the magazine (12) using an initially closed tool (5) which consists of at least one first and one second tool half (5a, 5b); (b) opening of both tool halves (5a, 5b), whereby the magazine (12) remains in the first tool half (5a); (c) replacing at least the second tool half (5b) with at least one additional tool half (5c); (d) replicative fabrication of at least one microstructured molded part (1, 3, 10) using the first tool half (5a) which contains the magazine (12) and the additional tool half (5c); and (e) simultaneous demolding of the magazine (12) and the molded part (1, 3, 10) as one magazine/molded part composite (15), is depicted in FIGS. 15 to 19. The injection molding tool (5) consists of one first tool half (5a) and one second tool half (5b), which are shown in their open position in FIG. 15. The first tool half (5a) includes ejector pins (11a to 11e) and mold mounts (7d). The second tool half (5b) includes sprue-side mold mounts (7c) with sprue channels (29) and gate (29a).

Figure 16:
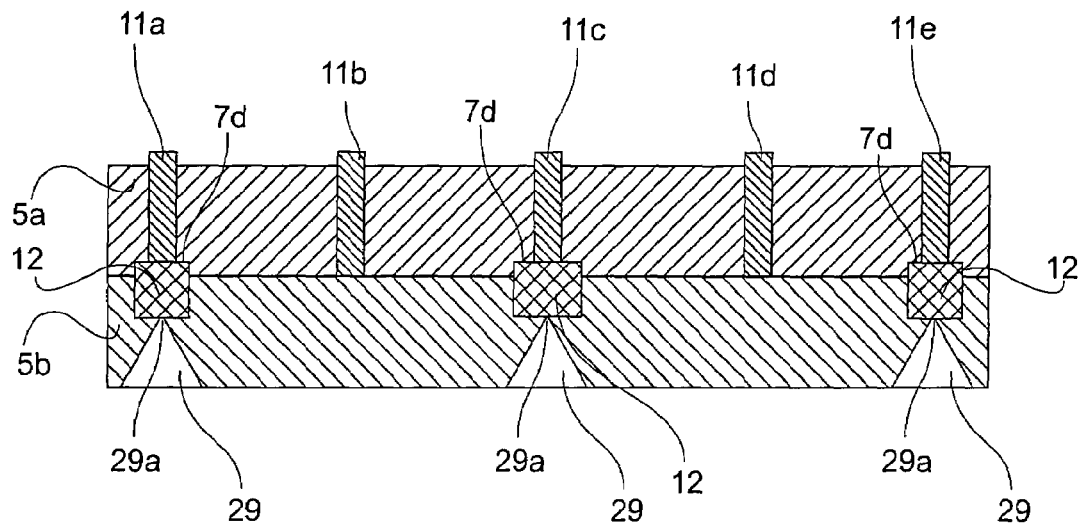
Figure 17:
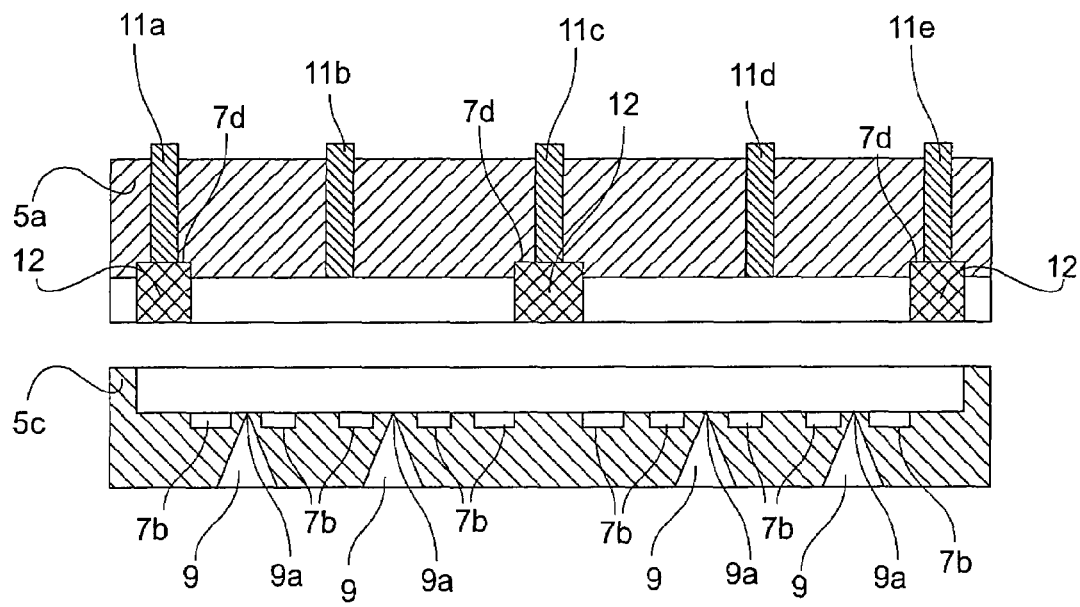
Figure 18:
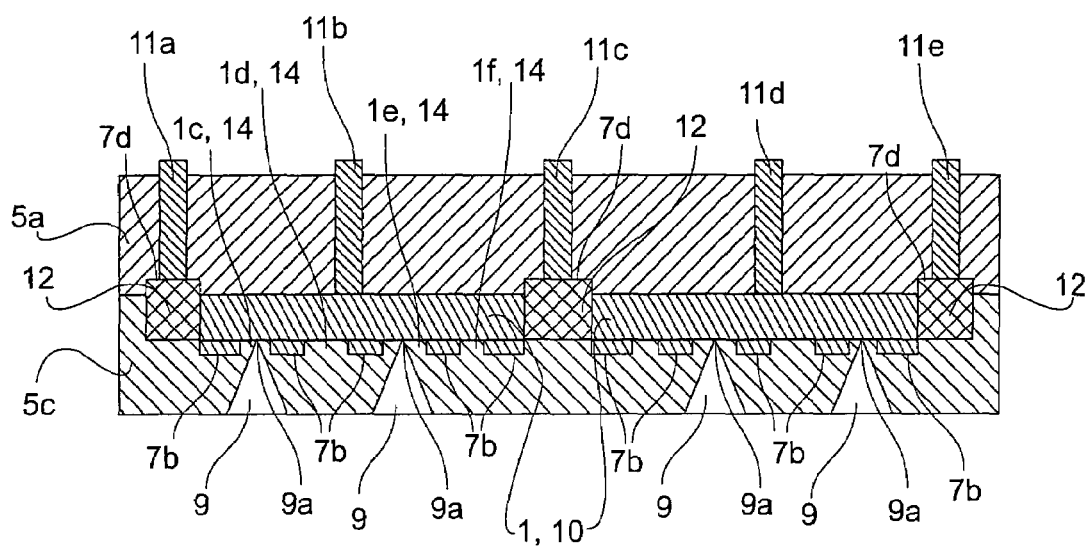

FIG. 16 shows the injection molding tool in its closed position. Mold material is injected through the sprue channels (29) to fabricate the magazine (12) in the mold mounts (7c and 7d). In FIG. 17, the injection molding tool is opened, whereby the magazine (12) remains in the first tool half (5a). The second tool half (5b) is replaced with another tool half (5c) which contains sprue-side mold mounts (7b). In FIG. 18 the molding tool is closed again and plastic material is injected through the sprue channels (9) to injection mold the microcomponents (1, 10). The microcomponents (1, 10) are inside the magazine (12) and are enclosed by the magazine (12).

Figure 19:
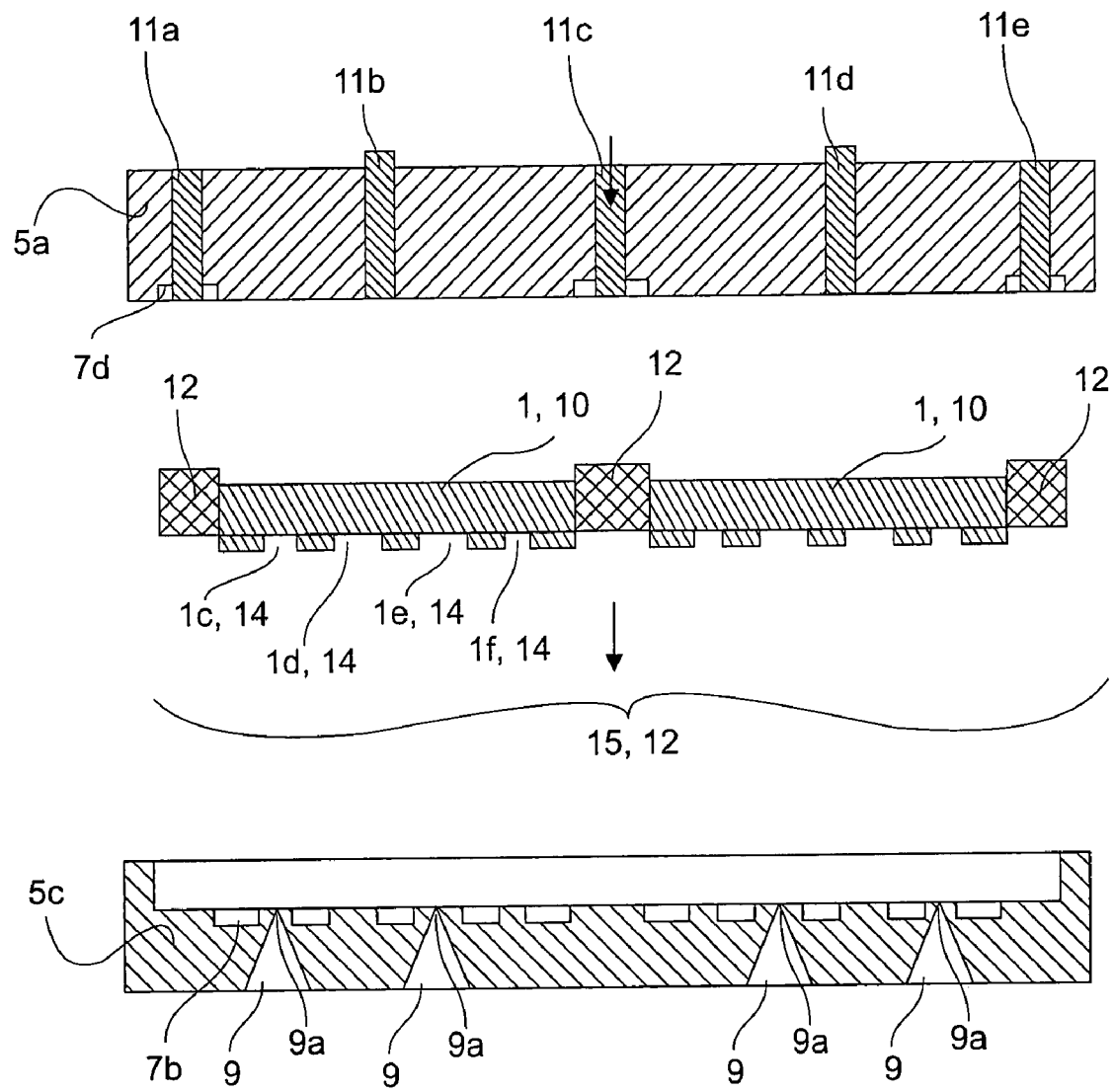
Figure 20:
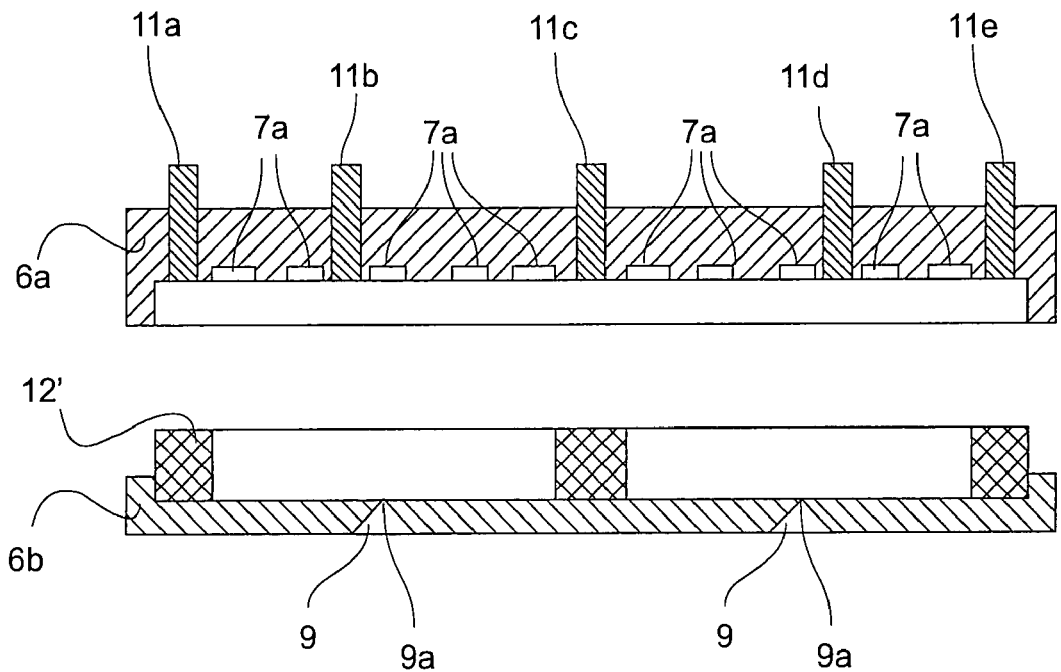
FIGS. 20 to 23 show a tool for replicative fabrication of a magazine/molded part composite in various process steps.

FIG. 19 shows the demolding process, whereby the magazine with the microcomponents (1, 10) is ejected by the ejector pins (11a to 11e).

Since in the preferred direct consecutive 2-component injection molding process in a tool setup for the replicative fabrication of microcomponents (1, 3, 10) and the magazine (12), the first mold material should have a higher softening point than the second mold material in order to avoid softening and deliquesce of the first fabricated molded part, this modified process provides and advantage over the previously described process allowing the use of mold material with a comparably higher softening point for the replicative fabrication of the magazine (12). Accordingly, a molding material with a comparably lower softening point can be used for the fabrication of microcomponents (1, 3, 10). This allows the use of new combinations of various molding materials causing again considerable improvement of the flexibility for the fabrication of the invented magazine (12) with microcomponents (10) as one magazine/molded part composite (15). Additionally, the combination variety and the physical properties associated with the mold material in the magazine/molded part composite (15), like mechanical strength, optical transparency, temperature resistance as well as adherence and detachment ability will be improved significantly.

Since the procedure for replicative fabrication and packaging of at least one microstructured molded part as one magazine/molded part composite, characterized by the following process steps: (a) replicative fabrication of the magazine (12) using an initially closed tool (5) which consists of at least one first and one second tool half (5a, 5b); (b) opening of both tool halves (5a, 5b). whereby the magazine (12) remains in the first tool half (5a); (c) replacing at least the second tool half (5b) with at least one additional tool half (5c); (d) replicative fabrication of at least one microstructured molded part (1, 3, 10) using the first tool half (5a) which contains the magazine (12) and the additional tool half (5c); and (e) simultaneous demolding of the magazine (12) and the molded part (1, 3, 10) as one magazine/molded part composite (15) provides that the first replicatively fabricated magazine (12) subsequently defines a lateral boundary in form of a mold insert, but also could define an upper and/or lower boundary for the replicative fabrication of the microcomponents (1, 3, 10), it is within the meaning of the invention to reuse a magazine (12) that was prefabricated by the procedure for the replicative fabrication and packaging of at least one microstructured molded part as one magazine/molded part composite characterized by the following process steps: (a) replicative fabrication of at least one microstructured molded part (1, 3, 10) using a prefabricated magazine (12'); and (b) simultaneous demolding of the magazine (12') and the molded parts 1, 3, 10) as one magazine/molded part composite (15') for the fabrication of microcomponents (10). This results in even higher efficiency for the fabrication of the invented magazine (12), since now only the microcomponents (1, 3, 10) have to be fabricated. Furthermore, the flexibility during fabrication of the invented magazine (12) can be increased again, since the prefabricated magazine (12) can be modified through the replication process for the microcomponent (10) fabrication. For example, a plastic material with bound metal components may be used to create metallic areas or metallic structures on the magazine (12) surface so the magazine (12) later can be gripped with a magnetic gripper for positioning. Prefabricated magazines (12) made of metal or ceramic materials may be used in this procedure for the replicative fabrication and packaging of at least one microstructured molded part as one magazine/molded part composite characterized by the following process steps: (a) replicative fabrication of at least one microstructured molded part (1, 3, 10) using a prefabricated magazine (12'); and (b) simultaneous demolding of the magazine (12') and the molded parts 1, 3, 10) as one magazine/ molded part composite (15').

Figure 21:
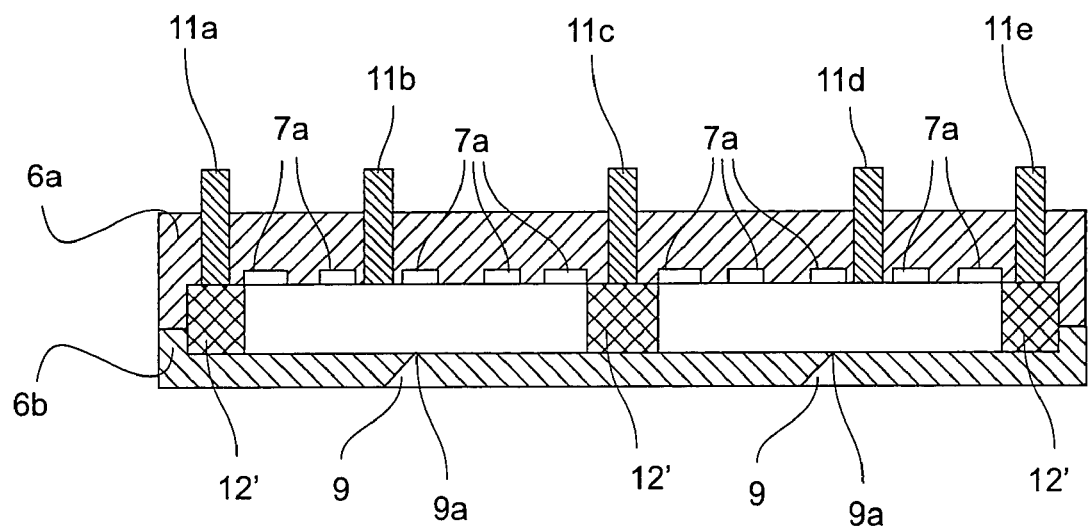
Figure 22:
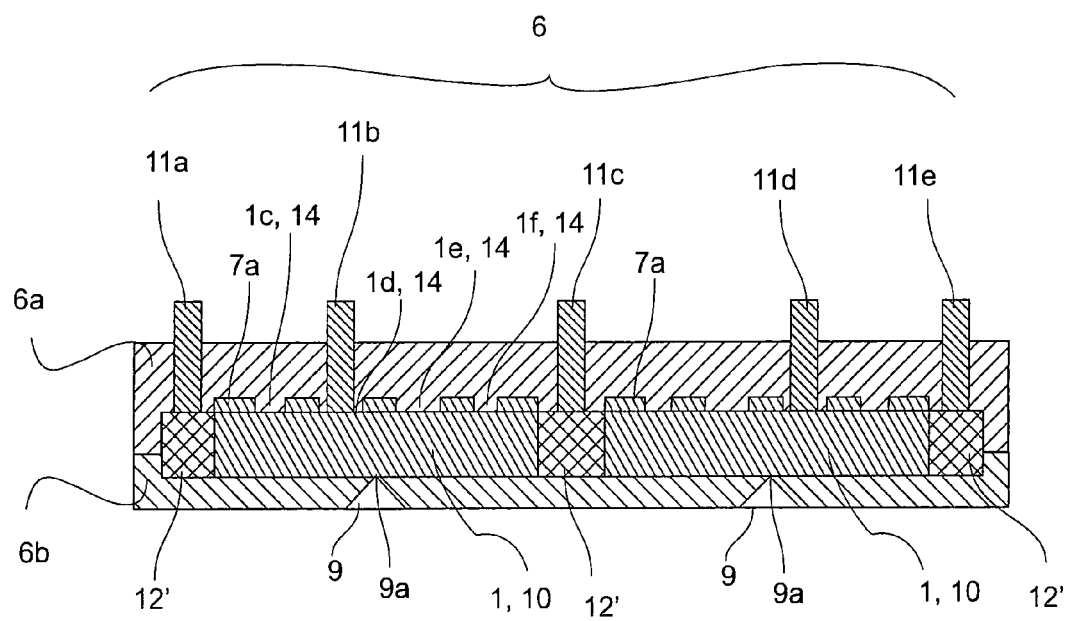
Figure 23:
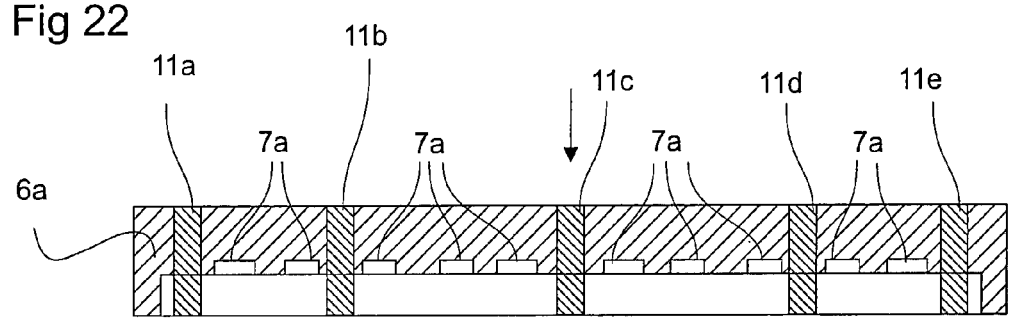
Figure 23:
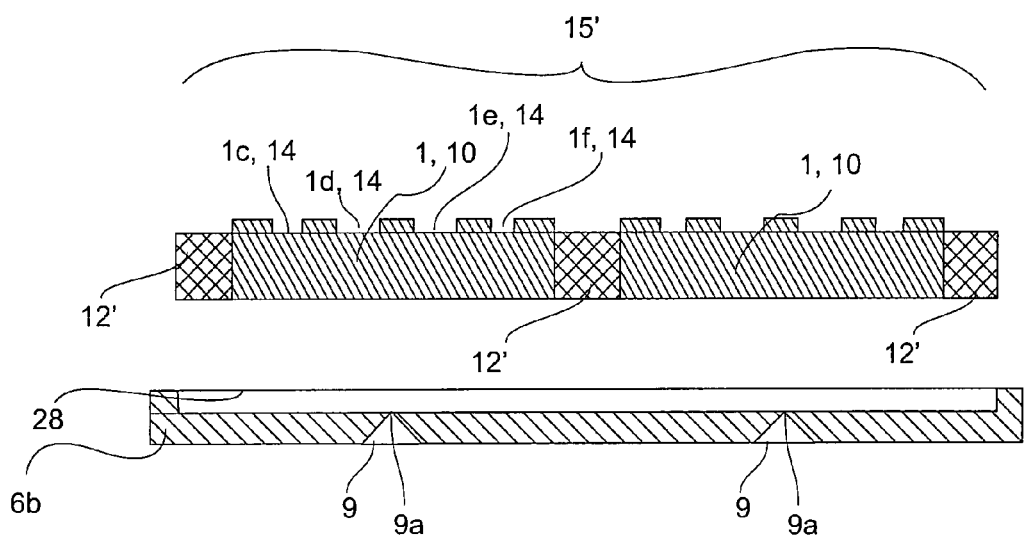

The procedure for the replicative fabrication and packaging of at least one microstructured molded part as one magazine/molded part composite characterized by the following process steps: (a) replicative fabrication of at least one microstructured molded part (1, 3, 10) using a prefabricated magazine (12'); and (b) simultaneous demolding of the magazine (12') and the molded parts (1, 3, 10) as one magazine/ molded part composite (15'), and also characterized by using a split tool (6) which consists of at least one first and one second tool half (6a, 6b) is depicted in FIGS. 20 to 23. The prefabricated magazine (12') is inserted into an additional injection molding tool (6) consisting of two tool halves (6a and 6b). The same reference numbers indicate the same components in this drawing. After closing the injection molding tool, the microcomponents (1, 10) are injection molded by introducing the mold material through the sprue channels as shown in FIGS. 21 and 22. Then the ejectors (11a to 11e) eject the magazine/ molded part composite (15') as shown in FIG 23.

Another design form of the invented procedure is to place the first replicatively fabricated molded part, i.e., the microstructured molded part or the magazine (12) with or without mold insert into a new injection molding tool and maybe even in a second injection molding tool in order to replicatively produce a second molded part, e.g. the microcomponent (1, 3, 10) as defined under this invention. One disadvantage of this procedure is the extensive equipment requirement. However, a longer time interval between fabrication of the first and second molded parts may be desired due to the shrinkage of the first mold material.

REFERENCE NUMBERS

1 Microcomponent
1a Bottom part
1b Face part

1b' Face surface
1c-f Sinks
3 2-step micro-gear
4 to 6 Injection molding tool
4a to 6a First tool half
4b to 6b Second tool half
4c, 5c Additional tool half
7a, a' Closure-side mold mount
7b, b' Sprue-side mold mount
7c Additional sprue-side mold mount
7d Mount
8a, a' Microstructured mold insert
8b, b' Tray-shaped mold insert
8c Additional tray-shaped mold insert
9, 9', 9" Sprue channel
9a, a', a" Gate
10 Microcomponent
11a-3 Ejector pin
12, 12' Magazine
13 Wafer
14 Microstructure
15, 15' Magazine/molded part composite
16 Magazine overhang
17 Recess
18, 18' Side surface
18a, a' Part of the side surface
18b, b' Part of the side surface
19a-c Part of the side surface
21 Separation level
25 Walls
26 Channel
27a, a' Tray
28 Tray
29 Additional sprue channel
29a Gate
30 Micro-gear
31 Micro-gear
32a-h Teeth
33a-h Teeth
34 Bottom surface
35 Face surface
36 Step part

The invention claimed is:

1. A magazine with at least one microstructured molded part, comprising:
   a prefabricated magazine/molded part composite, wherein the at least one microstructured molded part includes a bottom surface, a face surface, and side surfaces located between the bottom surface and the face surface, wherein the magazine is connected to the at least one microstructured molded part through an adhering contact of only the side surfaces whereby at least part of the side surfaces of the at least one microstructured molded part is exposed, wherein the magazine and the at least one microstructured molded part are made of different materials, and wherein the microstructured molded part is detachable from the magazine.

2. The magazine according to claim 1, wherein the magazine has a different physical height in comparison to a maximum physical height of the at least one microstructured molded part measured between the bottom surface and the face surface.

3. The magazine according to claim 1, wherein the magazine has a wafer form in a standard format common for semi-conductor technology.

4. The magazine according to claim 1, wherein the magazine is connected to the at least one microstructured molded part at its microstructures.

5. The magazine according to claim 1, wherein the magazine adjoins the side surfaces of the at least one microstructured molded part and has at least one recess adjacent a part of the side surfaces.

6. The magazine according to claim 1, wherein the magazine and the at least one microstructured molded part are fabricated replicatively.

7. The magazine according to claim 1, wherein the magazine is reusable as prefabricated magazine after removal of the at least one microstructured molded part from the magazine.

8. The magazine according to claim 1, wherein the magazine is connected to several equally spaced molded parts.

9. The magazine according to claim 2, wherein the magazine has a wafer form.

10. The magazine according to claim 9, wherein the magazine is connected to the at least one microstructured molded part at its microstructures.

11. The magazine according to claim 9, wherein the magazine adjoins the side surfaces of the at least one microstructured molded part and has at least one recess adjacent a part of the side surfaces.

12. The magazine according to claim 9, wherein the magazine and the at least one microstructured molded part are fabricated replicatively.

13. The magazine according to claim 9, wherein the magazine is reusable as prefabricated magazine after removal of the at least one microstructured molded part from the magazine.

14. The magazine according to claim 9, wherein the magazine is connected to several equally spaced molded parts.

15. A magazine with at least one microstructured molded part, comprising:
   a prefabricated magazine/molded part composite, wherein the at least one microstructured molded part includes a bottom surface, a face surface, and side surfaces located between the bottom surface and the face surface, wherein the magazine is connected to the at least one microstructured molded part through an adhering contact of only the side surfaces whereby at least part of the side surfaces of the at least one microstructured molded part is exposed, wherein the magazine and the at least one microstructured molded part are made of different materials, and wherein the microstructured molded part is formed of a molding material having a lower softening point than a molding material forming the magazine.

16. The magazine according to claim 15, wherein the magazine has a different physical height in comparison to a maximum physical height of the at least one microstructured molded part measured between the bottom surface and the face surface, and wherein the magazine has a wafer form in a standard format common for semi-conductor technology.

17. The magazine according to claim 16, wherein the magazine is connected to the at least one microstructured molded part at its microstructures.

18. A magazine with at least one microstructured molded part, comprising:
   a prefabricated magazine/molded part composite, wherein the at least one microstructured molded part includes a bottom surface, a face surface, and side surfaces located between the bottom surface and the face surface, wherein the magazine is connected to the at least one microstructured molded part through an adhering contact of only the side surfaces whereby at least part of the side surfaces of the at least one microstructured molded part is exposed, wherein the magazine and the at least one microstructured molded part are made of different materials, wherein the microstructured molded part is detachable from the magazine, and wherein the microstructured molded part is formed of a molding material having a lower softening point than a molding material forming the magazine.

19. The magazine according to claim 18, wherein the magazine has a different physical height in comparison to a maximum physical height of the at least one microstructured molded part measured between the bottom surface and the face surface, and wherein the magazine has a wafer form in a standard format common for semi-conductor technology.

20. The magazine according to claim 19, wherein the magazine is connected to the at least one microstructured molded part at its microstructures.

* * * * *